US012762890B2

(12) United States Patent
Terayoko et al.

(10) Patent No.: US 12,762,890 B2
(45) Date of Patent: Oct. 13, 2026

(54) INFORMATION MANAGEMENT FOR EVENT PARTICIPANT TRACKING SYSTEM, INFORMATION MANAGEMENT METHOD, AND PROGRAM

(71) Applicant: FUJIFILM Corporation, Tokyo (JP)

(72) Inventors: Hajime Terayoko, Kanagawa (JP); Shinichiro Sonoda, Kanagawa (JP); Nobuya Tanaka, Kanagawa (JP); Hirotoshi Yoshizawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 874 days.

(21) Appl. No.: 17/942,164

(22) Filed: Sep. 11, 2022

(65) Prior Publication Data

US 2023/0005297 A1 Jan. 5, 2023

Related U.S. Application Data

(63) Continuation of application No. PCT/JP2020/045526, filed on Dec. 7, 2020.

(30) Foreign Application Priority Data

Mar. 13, 2020 (JP) ................................ 2020-044698

(51) Int. Cl.
*G06V 40/16* (2022.01)
*G06F 21/32* (2013.01)
(Continued)

(52) U.S. Cl.
CPC ............ *G06V 40/172* (2022.01); *G06F 21/32* (2013.01); *G06K 19/06103* (2013.01);
(Continued)

(58) Field of Classification Search
CPC .................. G06V 40/172; G06F 21/32; G06K 19/06103; G06Q 10/02; G06Q 10/10;
(Continued)

(56) References Cited

U.S. PATENT DOCUMENTS 9,710,636 B1 7/2017 Redpath
9,928,839 B1 * 3/2018 Lester ................ H04L 63/0861
(Continued)

FOREIGN PATENT DOCUMENTS

CN 103793639 5/2014
CN 110752914 2/2020
(Continued)

OTHER PUBLICATIONS

D. Xia et al., "Research on Individual Visitor Modeling Based on Learning Analysis," 2018, 9th International Conference on Information Technology in Medicine and Education (ITME), pp. 572-576 (Year: 2018).*

(Continued)

*Primary Examiner* — Vu Le
(74) *Attorney, Agent, or Firm* — JCIPRNET

(57) ABSTRACT

An information management system includes a reception device including a camera that images a face of a participant, and an information management apparatus. The information management apparatus issues a digital key assigned for each participant independently of personal information of the participant and transmits the digital key to the reception device. In a case where the reception device outputs an ID image of the participant, the information management apparatus acquires a face image from the reception device and stores the face image and the digital key in a database in association with each other. In a case where information including the digital key is received from a reading device installed in an event venue, the information management apparatus stores the received information in the database in association with the digital key as behavior information representing a behavior of the participant in the event venue.

12 Claims, 28 Drawing Sheets

(51) Int. Cl.

| | |
|---|---|
| ***G06K 19/06*** | (2006.01) |
| ***G06Q 10/02*** | (2012.01) |
| ***G06Q 30/0201*** | (2023.01) |
| ***G07C 9/25*** | (2020.01) |
| ***G07C 9/27*** | (2020.01) |
| ***G07C 9/28*** | (2020.01) |
| ***H04L 9/08*** | (2006.01) |
| ***H04L 67/1396*** | (2022.01) |
| ***H04L 67/50*** | (2022.01) |

(52) U.S. Cl.
CPC ......... *G06Q 10/02* (2013.01); *G06Q 30/0201* (2013.01); *G07C 9/28* (2020.01); *H04L 9/0861* (2013.01); *H04L 9/088* (2013.01); *H04L 67/1396* (2022.05); *H04L 67/535* (2022.05); *G07C 9/257* (2020.01); *G07C 9/27* (2020.01); *G07C 2209/41* (2013.01)

(58) Field of Classification Search
CPC ...... G06Q 30/0201; G06Q 50/10; G07C 9/27; G07C 9/257; G07C 9/28; G07C 2209/41; H04L 9/00861; H04L 9/088; H04L 67/1396; H04L 67/535
See application file for complete search history.

(56) References Cited

U.S. PATENT DOCUMENTS

| | | | | |
|---|---|---|---|---|
| 11,096,059 | B1 * | 8/2021 | Shahidzadeh | G06F 21/316 |
| 11,645,729 | B1 * | 5/2023 | Kocher | G06Q 10/10 705/325 |
| 12,169,992 | B2 * | 12/2024 | Seenivasagam | H04L 63/107 |
| 2002/0103561 | A1 | 8/2002 | Ashida et al. | |
| 2006/0206351 | A1 * | 9/2006 | Hodges | G06Q 50/265 705/325 |
| 2014/0363057 | A1 * | 12/2014 | Eckel | G06F 21/32 382/116 |
| 2016/0188969 | A1 * | 6/2016 | Chung | G06Q 50/26 382/115 |
| 2017/0053106 | A1 | 2/2017 | Serrato | |
| 2020/0366671 | A1 * | 11/2020 | Larson | H04L 9/3231 |
| 2022/0351562 | A1 | 11/2022 | Fujii et al. | |

FOREIGN PATENT DOCUMENTS

| | | | |
|---|---|---|---|
| EP | 3142079 | 3/2017 | |
| GB | 2342208 | 4/2000 | |
| JP | 2002230214 | 8/2002 | |
| JP | 2006315305 | 11/2006 | |
| JP | 2011150101 | 8/2011 | |
| JP | 2013190934 | 9/2013 | |
| KR | 20200018990 A * | 2/2020 | G07C 9/28 |
| WO | 2017183044 | 10/2017 | |
| WO | 2019139663 | 7/2019 | |
| WO | WO-2019205950 A1 * | 10/2019 | G06Q 30/0201 |
| WO | 2020039630 | 2/2020 | |

OTHER PUBLICATIONS

Machine English Translation of KR-20200018990-A with original document.*

Kiyoshi Yanagisawa et al., “Acess Control Management System using Face Recognition Technology” with English concise explanation, Nippon Signal Technical Journal, Mar. 2002, pp. 1-9.

“International Search Report (Form PCT/ISA/210) of PCT/JP2020/045526,” mailed on Feb. 16, 2021, with English translation thereof, pp. 1-5.

“Written Opinion of the International Searching Authority (Form PCT/ISA/237)” of PCT/JP2020/045526, mailed on Feb. 16, 2021, with English translation thereof, pp. 1-6.

“Search Report of Europe Counterpart Application”, issued on Jul. 26, 2023, p. 1-p. 7.

Zhang; Liang et al., “Application of HD Camera Technology in Laiwu Steel’s Road Checkpoints”, Kejifeng, Feb. 25, 2012, with English translation thereof, pp. 1-3.

“First Notice of Office Action of China Counterpart Application”, issued on Feb. 14, 2026, with English translation thereof, p. 1-p. 22.

* cited by examiner

INFORMATION MANAGEMENT FOR EVENT PARTICIPANT TRACKING SYSTEM, INFORMATION MANAGEMENT METHOD, AND PROGRAM

CROSS-REFERENCE TO RELATED APPLICATIONS

This application is a continuation application of International Application No. PCT/JP2020/045526, filed Dec. 7, 2020, the disclosure of which is incorporated herein by reference in its entirety. Further, this application claims priority under 35 USC 119 from Japanese Patent Application No. 2020-044698 filed Mar. 13, 2020, the disclosure of which is incorporated by reference herein.

BACKGROUND

1. Technical Field

The disclosed technology relates to an information management system, an information management method, and a program.

2. Related Art

JP2006-315305A discloses a management system that manages entering and exiting of an event venue by a visitor and entering and exiting of a booth provided in the venue. The management system receives an input of personal information from the visitor, images a face of the visitor by a camera, and prints a visitor card used as an ID card of the visitor by a printer. The personal information input by the visitor is a name, a department, and the like. For example, the department is a name of an organization such as a company in which the visitor works. The name, the department, and a face photo of the visitor and a two-dimensional code are printed on the visitor card. The two-dimensional code is information in which the input name and department of the visitor are coded.

A scanner is installed near each booth in the event venue and near an exit. The number of users of each booth and the number of exiting persons are counted by causing the visitor to read the two-dimensional code of the visitor card by the scanner before using the booth and before exiting.

SUMMARY

In the management system in JP2006-315305A, the number of entering and exiting persons of the event venue and the number of users of each booth are counted in real time. In a case where the management system in JP2006-315305A is used, an event organizer can collect behavior information of the visitor indicating which booth the visitor stops by. In addition, since the name, the department, and the like of the visitor are also collected, an approximate attribute of the visitor such as a sex and the department of the visitor can be perceived based on such information. Thus, for example, what kind of attribute and preference a person has can be perceived based on the collected behavior information.

As illustrated by the visitor to the event venue, perceiving a behavior of a participant in accordance with an approximate attribute of the participant participating in an event is more useful for an organizer of the event, compared to a case of simply perceiving the behavior of the participant from the number of persons. For example, in a case of using the collected behavior information of the participant for marketing or the like, the collected behavior information is considered to be more useful in a case where an approximate attribute of the participant can be perceived.

On the other hand, in the management system in JP2006-315305A, in a procedure of issuing the visitor card, the visitor that is an example of the participant needs to input the personal information including the name and the department at the time of entering. An input procedure of the personal information such as the name is a cause of extending a time for reception processing at the time of entering. Thus, the organizer of the event desires the input procedure to be as simple as possible. In addition, from a standpoint of a participant side, there is also a person who feels that the input procedure of the personal information such as the name is cumbersome, or feels reluctant to submit the personal information such as the name. An increase in the number of persons who hesitate about participating in the event or avoid the event for such a reason is not preferable for an organizer side of the event.

There are various types of events. While there is an event that needs strict participant management such that personal information has to be collected to an extent in which an individual participant can be specified, there is also an event that does not need strict participant management. For example, the event that does not need strict participant management is an event that requires the minimum participant management required for crime prevention such as a measure for a suspicious person, but does not need collection of the name and the like with which an individual person can be specified.

In addition, even in a case where the event does not need strict participant management, information representing an approximate attribute of the visitor such as a sex and an age is useful for marketing or the like and thus, is useful information for the organizer of the event. Thus, the organizer side of the event has a strong desire to collect information representing an approximate attribute of the participant even in a case where the name and the department are not known.

One embodiment according to the disclosed technology provides an information management system, an information management method, and a program that can collect behavior information of a participant while reducing an input procedure of personal information by the participant participating in an event compared to the related art.

According to a first aspect according to the disclosed technology, an information management system is an information management system comprising a reception device including a camera that images a face of a participant participating in an event, and an information management apparatus that is communicably connected to the reception device and manages information about the participant, in which the information management apparatus includes at least one first processor, and the first processor is configured to receive an issuing request transmitted from the reception device for a digital key assigned to each participant, issue the digital key independently of personal information of the participant, transmit the issued digital key to the reception device, in a case where the reception device outputs an ID image of the participant that includes a face image representing the face of the participant imaged by the reception device and the digital key received by the reception device and is issued for each participant, acquire the face image from the reception device, store the face image and the digital key in a storage portion in association with each other, and in a case where information including the digital key is received from a plurality of reading devices that are installed in an event venue and read the digital key included in the ID image, store the received information in the storage portion in association with the digital key as behavior information representing a behavior of the participant in the event venue.

A second aspect according to the disclosed technology is the information management system according to the first aspect, in which the reception device includes at least one second processor, and the second processor is configured to create the ID image by combining the face image of the participant with a template image, and output the ID image.

A third aspect according to the disclosed technology is the information management system according to the second aspect, in which the second processor is configured to output the ID image to a printer.

A fourth aspect according to the disclosed technology is the information management system according to the third aspect, in which the reception device includes a digital camera including a printer that includes the camera and a printer which prints the face image (face image captured by the camera) obtained by imaging performed by the camera on an instant film.

A fifth aspect according to the disclosed technology is the information management system according to any one of the first to fourth aspects, in which the digital key is included in the ID image in a form of a two-dimensional code.

A sixth aspect according to the disclosed technology is the information management system according to the first aspect, in which the first processor is configured to transmit a template image to be combined with the face image to the reception device in addition to the digital key.

A seventh aspect according to the disclosed technology is the information management system according to any one of the first to sixth aspects, in which the first processor is configured to count behavior information of a plurality of participants and output a counted counting result.

An eighth aspect according to the disclosed technology is the information management system according to the seventh aspect, in which the first processor is configured to output a counting result including the face image as the counting result.

A ninth aspect according to the disclosed technology is the information management system according to any one of the first to seventh aspects, in which the first processor is configured to receive a distribution request including the digital key from the participant and distribute the behavior information of the participant corresponding to the digital key.

A tenth aspect according to the disclosed technology is the information management system according to any one of the first to ninth aspects, in which the first processor is configured to, in a case where the information including the digital key is received from the reading device, request a surveillance camera arranged near the reading device to transmit surveillance data, receive the surveillance data from the surveillance camera, detect a face image from the surveillance data, determine whether or not a person who has operated the reading device and the participant associated with the digital key are the same person by comparing the detected face image with the face image stored in association with the digital key, and in a case where it is determined that the person who has operated the reading device and the participant associated with the digital key are the same person, store the received information in association with the digital key as the behavior information of the participant in the event venue.

According to an eleventh aspect according to the disclosed technology, an operation method of an information management system is an operation method of an information management system including a reception device including a camera that images a face of a participant participating in an event, and an information management apparatus that is communicably connected to the reception device and manages information about the participant, the operation method comprising a digital key issuing step of receiving an issuing request transmitted from the reception device for a digital key assigned to each participant, and issuing the digital key independently of personal information of the participant, a digital key transmission step of transmitting the issued digital key to the reception device, a face image acquisition step of acquiring, in a case where the reception device outputs an ID image of the participant that includes a face image representing the face of the participant imaged by the reception device and the digital key received by the reception device and is issued for each participant, the face image from the reception device, a storage step of storing the face image and the digital key in a storage portion in association with each other, and a behavior information storage step of storing, in a case where information including the digital key is received from a plurality of reading devices that are installed in an event venue and read the digital key included in the ID image, the received information in the storage portion in association with the digital key as behavior information representing a behavior of the participant in the event venue.

According to a twelfth aspect according to the disclosed technology, an operation program of an information management system is an operation program of an information management system including a reception device including a camera that images a face of a participant participating in an event, and an information management apparatus that is communicably connected to the reception device and manages information about the participant, the operation program causing a computer to function as a digital key issuing portion that receives an issuing request transmitted from the reception device for a digital key assigned to each participant, and issues the digital key independently of personal information of the participant, a digital key transmission portion that transmits the issued digital key to the reception device, a face image acquisition portion that, in a case where the reception device outputs an ID image of the participant that includes a face image representing the face of the participant imaged by the reception device and the digital key received by the reception device and is issued for each participant, acquires the face image from the reception device, a face image storage portion that stores the face image and the digital key in a storage portion in association with each other, and a behavior information storage portion that, in a case where information including the digital key is received from a plurality of reading devices that are installed in an event venue and read the digital key included in the ID image, stores the received information in the storage portion in association with the digital key as behavior information representing a behavior of the participant in the event venue.

BRIEF DESCRIPTION OF THE DRAWINGS

Exemplary embodiments of the technology of the disclosure will be described in detail based on the following figures, wherein.

DETAILED DESCRIPTION

First Embodiment

Figure 1:
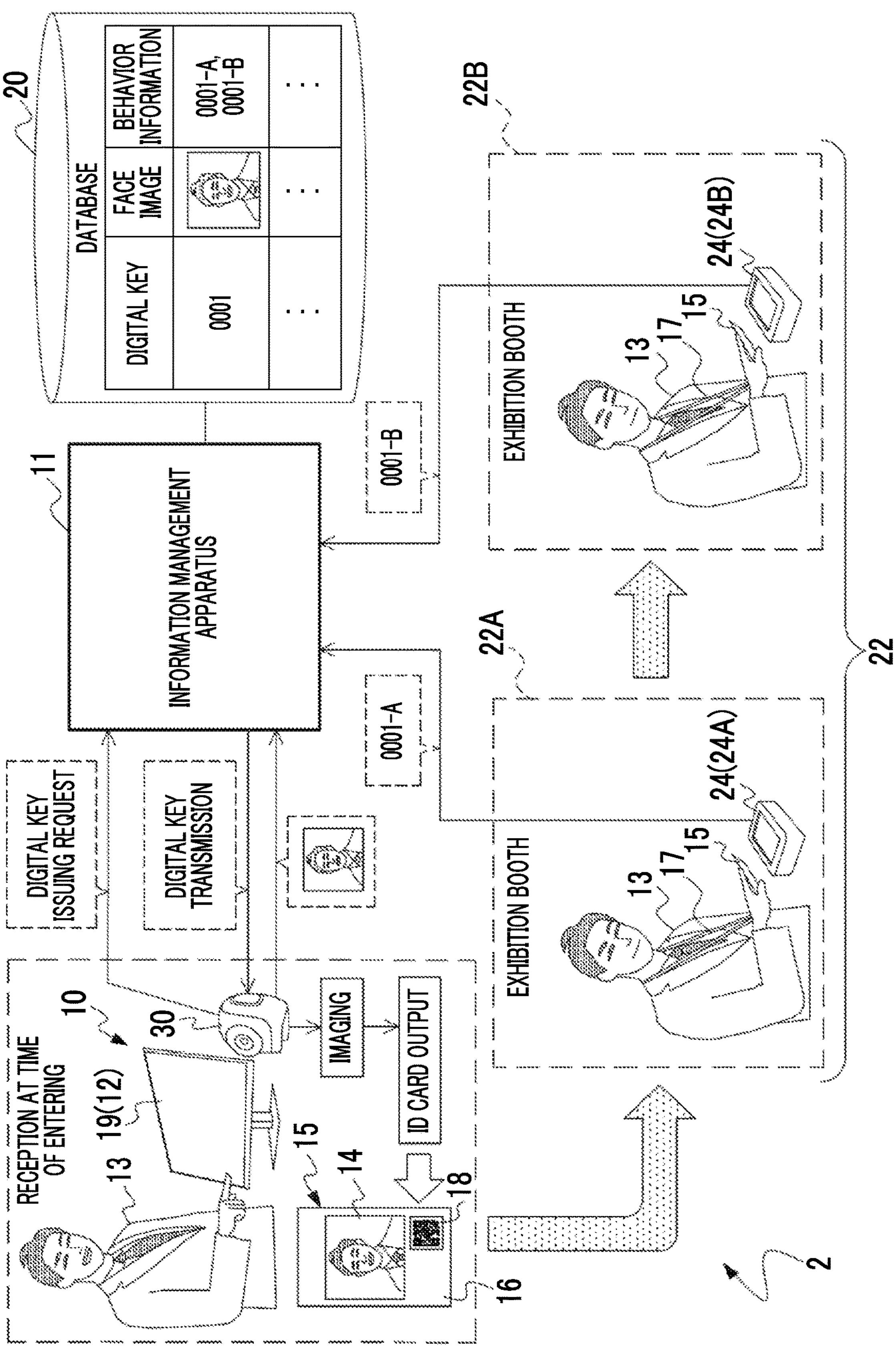
FIG. 1 is a schematic diagram of an information management system according to a first embodiment.

As illustrated in FIG. 1 as an example, an information management system 2 comprises a reception device 10 and an information management apparatus 11. For example, the reception device 10 is installed on a reception counter of an event venue. For example, the reception device 10 includes a digital camera 30 including a printer, a touch panel display 19, and a speaker 12 incorporated in the touch panel display 19. The touch panel display 19 and the speaker 12 provides a guide for a method of creating an identification data (ID) card 15 to a participant 13 of an event who has visited the reception counter, through a video and voice. Here, the participant 13 includes a visitor to the event venue.

The ID card 15 is a participant identification for identifying the participant 13 participating in the event and is a card to be carried by the participant 13 during at least participation in the event. The ID card 15 is created for each participant 13 in entering the event venue. A face image 14 of the participant 13 is printed on the ID card 15. The ID card 15 is not only used as the participant identification but also used for collecting behavior information of the participant 13 as will be described later.

The digital camera 30 including the printer has a camera function of imaging a face of the participant 13 and a printing function of printing the face image 14 including the imaged face. For example, the digital camera 30 including the printer is an instant camera that has a printing function enabling instant printing of an image (captured image) acquired by performing imaging. By the printing function, the digital camera 30 including the printer instantaneously issues the ID card 15 on which the face image 14 of the participant 13 is printed, at the time of reception in entering the event venue by the participant 13. In addition, in the present example, the digital camera 30 including the printer comprises a control function of controlling the touch panel display 19 and the speaker 12 and a communication function with the information management apparatus 11 and functions as a main portion of the reception device 10.

After the face image 14 of the participant 13 is acquired, the digital camera 30 including the printer included in the reception device 10 requests the information management apparatus 11 to issue a digital key. The digital key is identification information of the participant 13 that is issued independently of personal information of the participant 13 and is assigned for each participant 13. The digital key is management information, described later, for perceiving the behavior information of each participant 13. In the present example, the digital key is a reference number assigned to each participant 13 in order of visitors of the participants 13. In the example in FIG. 1, a four-digit number such as a digital key "0001" is the digital key assigned to one participant 13. Such a digital key is assigned for each participant 13. The information management apparatus 11 transmits the issued digital key to the digital camera 30 including the printer.

The digital camera 30 including the printer prints an ID image of the participant 13 on an instant film 16 and outputs the instant film 16 on which the ID image is printed as the ID card 15. The ID image is an image including the face image 14 and the digital key issued from the information management apparatus 11. In the present example, the digital key is coded and included in the ID image in the form of a two-dimensional code 18. The image including the face image 14 and the two-dimensional code 18 is printed on the instant film 16 as the ID image. For example, a QR code (registered trademark) is employed as the two-dimensional code 18. In addition, the two-dimensional code 18 includes not only the digital key but also a form in which a uniform resource locator (URL) or the like for referring to a my page screen 96 (refer to FIG. 14) described later is coded.

In addition, the digital camera 30 including the printer transmits the acquired (captured) face image 14 and the digital key corresponding to the face image 14 to the information management apparatus 11.

The information management apparatus 11 is communicably connected to the digital camera 30 including the printer of the reception device 10. For example, the information management apparatus 11 is a desktop personal computer, and the personal computer is comprised in a management booth of the event venue. The information management apparatus 11 receives a request to issue the digital key from the digital camera 30 including the printer and issues the digital key. In addition, the information management apparatus 11 receives the face image 14 and the digital key corresponding to the face image 14 transmitted from the digital camera 30 including the printer. The information management apparatus 11 stores the received face image 14 and the digital key in a database 20 in association with each other.

For example, the participant 13 attaches the ID card 15 to a neck strap 17 and moves in the event venue in a state where the ID card 15 is hung from a neck. A plurality of scanners 24 are installed in main locations in the event venue. The scanner 24 is a device for collecting the behavior information representing a behavior of the participant 13 in the event venue. The information management apparatus 11 is communicably connected to each scanner 24.

In a case where the participant 13 holds the ID card 15 on the scanner 24, the scanner 24 reads the two-dimensional code 18 of the ID card 15 and transmits information including the digital key indicated by the two-dimensional code 18 and a scanner ID to the information management apparatus 11. The scanner 24 is an example of a "reading device" according to the embodiment of the disclosed technology. The information management apparatus 11 stores the information received from the scanner 24 in the database 20 in association with the digital key as the behavior information of the participant 13 in the event venue.

As illustrated in FIG. 1 as an example, a plurality of exhibition booths including exhibition booths 22A and 22B are provided in the event venue. In the following description, the plurality of exhibition booths will be referred to as an "exhibition booth 22" unless otherwise necessary to distinguish. The scanner 24 is comprised at an entrance of each exhibition booth 22. A unique scanner ID is assigned to each scanner 24. For example, in FIG. 1, a scanner 24A comprised in the exhibition booth 22A has a scanner ID "A", and a scanner 24B comprised in the exhibition booth 22B has a scanner ID "B". In the following description, the scanners 24 will be referred to as the scanners, 24A, 24B, and the like in a case where distinction is necessary for each ID.

For example, in entering the exhibition booth 22, the participant 13 causes the scanner 24 to read the two-dimensional code 18 by holding the ID card 15 on the scanner 24.

In the example in FIG. 1, in a case where the participant 13 reads the two-dimensional code 18 by the scanner 24A arranged in the exhibition booth 22A, "0001-A" including the digital key "0001" and the scanner ID "A" is transmitted to the information management apparatus 11 as the behavior information. In the same manner, in a case where the participant 13 to which the same digital key "0001" is assigned reads the two-dimensional code 18 by the scanner 24B arranged in the exhibition booth 22B, "0001-B" including the digital key "0001" and the scanner ID "B" is transmitted to the information management apparatus 11 as the behavior information. In the present example, the behavior information "0001-A" transmitted by the scanner 24A is the behavior information representing the behavior of the participant 13 such that the participant 13 to which the digital key "0001" is assigned has entered the exhibition booth 22A. In the same manner, the behavior information "0001-B" transmitted by the scanner 24B is the behavior information representing the behavior of the participant 13 such that the participant 13 to which the digital key "0001" is assigned has entered the exhibition booth 22B.

The database 20 stores the digital key, the face image 14, and the behavior information in association with each other. First, in the reception at the time of entering, the information management apparatus 11 stores the issued digital key and the face image 14 in the database 20 in association with each other. Then, in a case where the information management apparatus 11 receives the behavior information from the scanner 24, the received behavior information is stored in association with the digital key in the database 20. In a case where the participant 13 performs a plurality of behaviors, a plurality of pieces of behavior information are accumulated in the database 20 for each participant 13. In the example in FIG. 1, the database 20 stores the behavior information "0001-A" and "0001-B" of the above example as the behavior information of the participant 13 having the digital key "0001".

For example, the database 20 is a storage device including a data storage device such as a hard disk drive (HDD) and a solid state drive (SSD) and a control circuit, and is an example of a "database (storage portion)" according to the embodiment of the disclosed technology. The database 20 stores data in accordance with a storage request from the information management apparatus 11, searches for data in accordance with a search request from the information management apparatus 11, and returns a search result to the information management apparatus 11. The database 20 may be provided inside the information management apparatus 11 or may be provided outside the information management apparatus 11. In a case where the database 20 is provided outside the information management apparatus 11, the database 20 and the information management apparatus 11 are communicably connected through a network such as a local area network (LAN).

Figure 2:
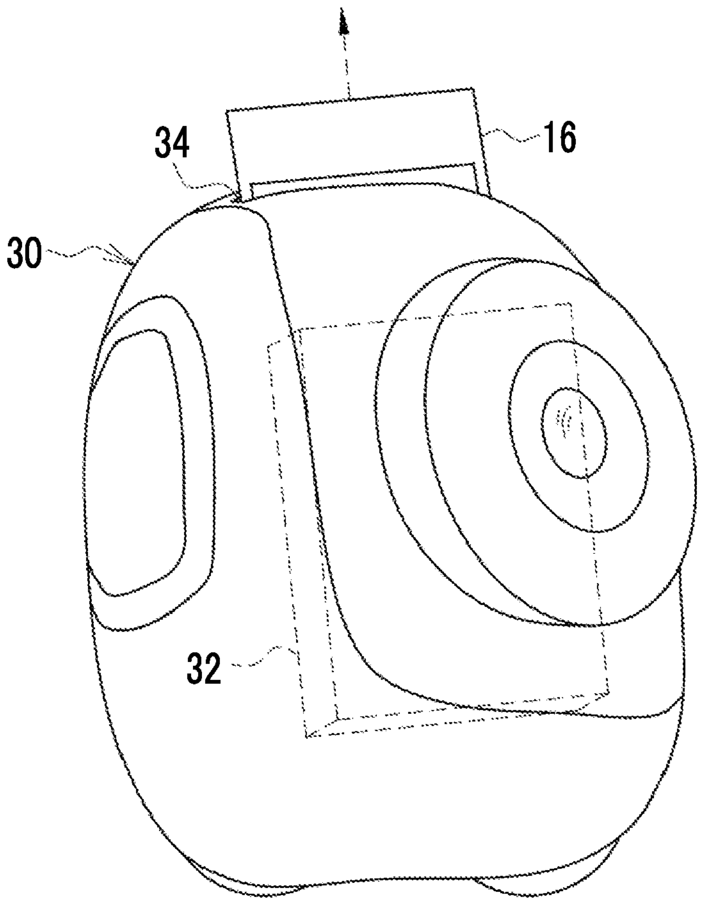
FIG. 2 is a perspective view of a digital camera including a printer.

As illustrated in FIG. 2 as an example, the digital camera 30 including the printer has a rounded box shape as a whole. As described above, the digital camera 30 including the printer of the present example is an instant camera, and a film pack 32 of the instant film 16 is interchangeably loaded into the digital camera 30 including the printer. The film pack 32 accommodates a plurality of, for example, 10, unused instant films 16.

A printer 35 (refer to FIG. 3) is comprised inside the digital camera 30 including the printer. The printer 35 prints the ID image on the instant film 16. The printed instant film 16 is discharged from a discharge port 34 formed in an upper portion of a camera body.

Figure 3:
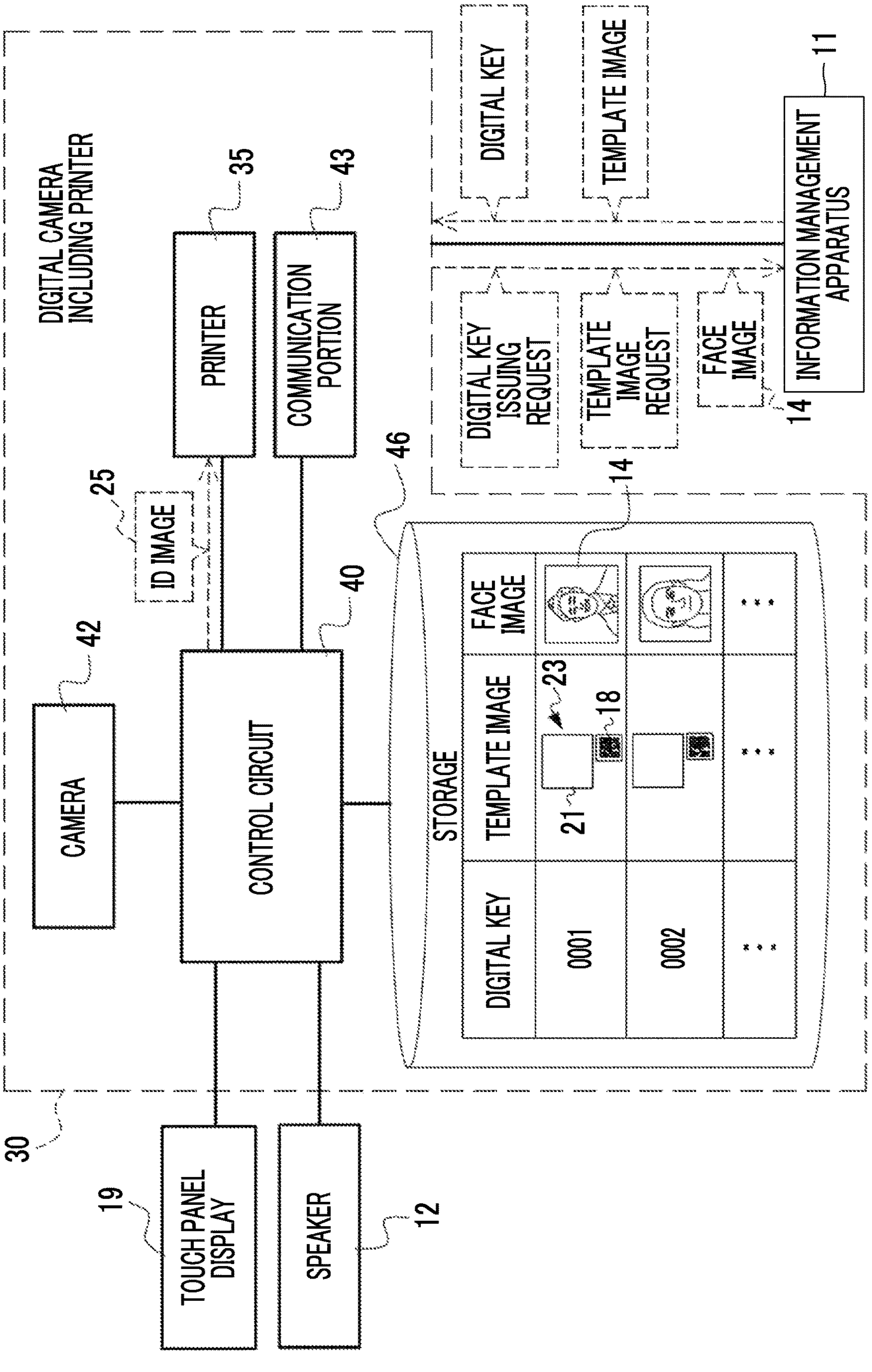
FIG. 3 is a block diagram of the digital camera including the printer.

As illustrated in FIG. 3 as an example, the digital camera 30 including the printer comprises a control circuit 40, a camera 42, a storage 46, the printer 35, and a communication portion 43. The camera 42 images a subject (including the participant 13 and a wall or the like in a background of the participant 13) captured within an imaging range and outputs the face image 14 including a face of the subject as an image representing the subject. For example, the camera 42 includes an imaging element such as a charge coupled device (CCD) image sensor and a complementary metal oxide semiconductor (CMOS) image sensor, and an imaging optical system that forms a subject image on an imaging surface of the imaging element. The camera 42 outputs the face image 14 that includes the face of the subject and is formed on the imaging surface of the imaging element, as digital data. Here, the camera 42 is an example of a "camera" according to the embodiment of the disclosed technology.

The printer 35 comprises an exposure unit as an example of a printing portion that prints an image on the instant film 16. The exposure unit includes a liquid crystal display portion that displays an image (captured image) acquired by performing imaging, and a light source for exposure. The exposure unit exposes the instant film 16 to image light corresponding to the image displayed on the liquid crystal display portion by irradiating the instant film 16 with light from the light source through the liquid crystal display portion. The instant film 16 comprises a photosensitive layer, and the exposed image is developed by applying a developer that is sealed in after the exposure onto the photosensitive layer.

For example, the control circuit 40 is a micro-processing unit (MPU) and generally controls an operation of the reception device 10 in addition to the digital camera 30 including the printer that includes the camera 42 and the printer 35. The control circuit 40 stores the face image 14 output from the camera 42 in the storage 46. The control circuit 40 is an example of a "second processor" according to the embodiment of the disclosed technology. The communication portion 43 is a communication interface for communicating with the information management apparatus 11 through a local area network (LAN) or a communication cable. The control circuit 40 communicates with the information management apparatus 11 through the communication portion 43. The communication portion 43 may be a wired interface or a wireless interface. In an environment such as the event venue in which the number of electronic apparatuses that emit radio waves, such as a smartphone carried by the participant 13, is large, it is preferable that the communication portion 43 is a wired interface in order to prevent a communication delay caused by interference between the radio waves.

In addition, each time the face image 14 is acquired by the camera 42, the control circuit 40 transmits a digital key issuing request to the information management apparatus 11. The control circuit 40 receives the digital key issued from the information management apparatus 11 in accordance with the digital key issuing request. The control circuit 40 stores the digital key in the storage 46 in association with the face image 14. For example, the storage 46 is a data storage device such as a flash memory and primarily stores data such as the face image 14 (face image 14 captured by the camera 42) acquired by imaging performed by the camera 42, that is, data acquired in the reception at the time of entering.

The control circuit 40 requests a template image 23 from the information management apparatus 11. As will be described in detail later, the template image 23 is data as a template of the ID image and is data to be combined with the face image 14. In addition, the two-dimensional code 18 obtained by coding the digital key is attached to the template image 23 by the information management apparatus 11. The control circuit 40 acquires the template image 23 to which the two-dimensional code 18 is attached from the information management apparatus 11. The control circuit 40 temporarily stores the template image 23 in the storage 46 in association with the digital key indicated by the two-dimensional code 18.

The control circuit 40 reads out the template image 23 and the face image 14 from the storage 46. The control circuit 40 generates an ID image 25 by combining the template image 23 with the face image 14 (refer to FIG. 4) and outputs the ID image 25 to the printer 35. The printer 35 prints the ID image 25 (refer to FIG. 4) input from the control circuit 40 on the instant film 16.

Figure 4:
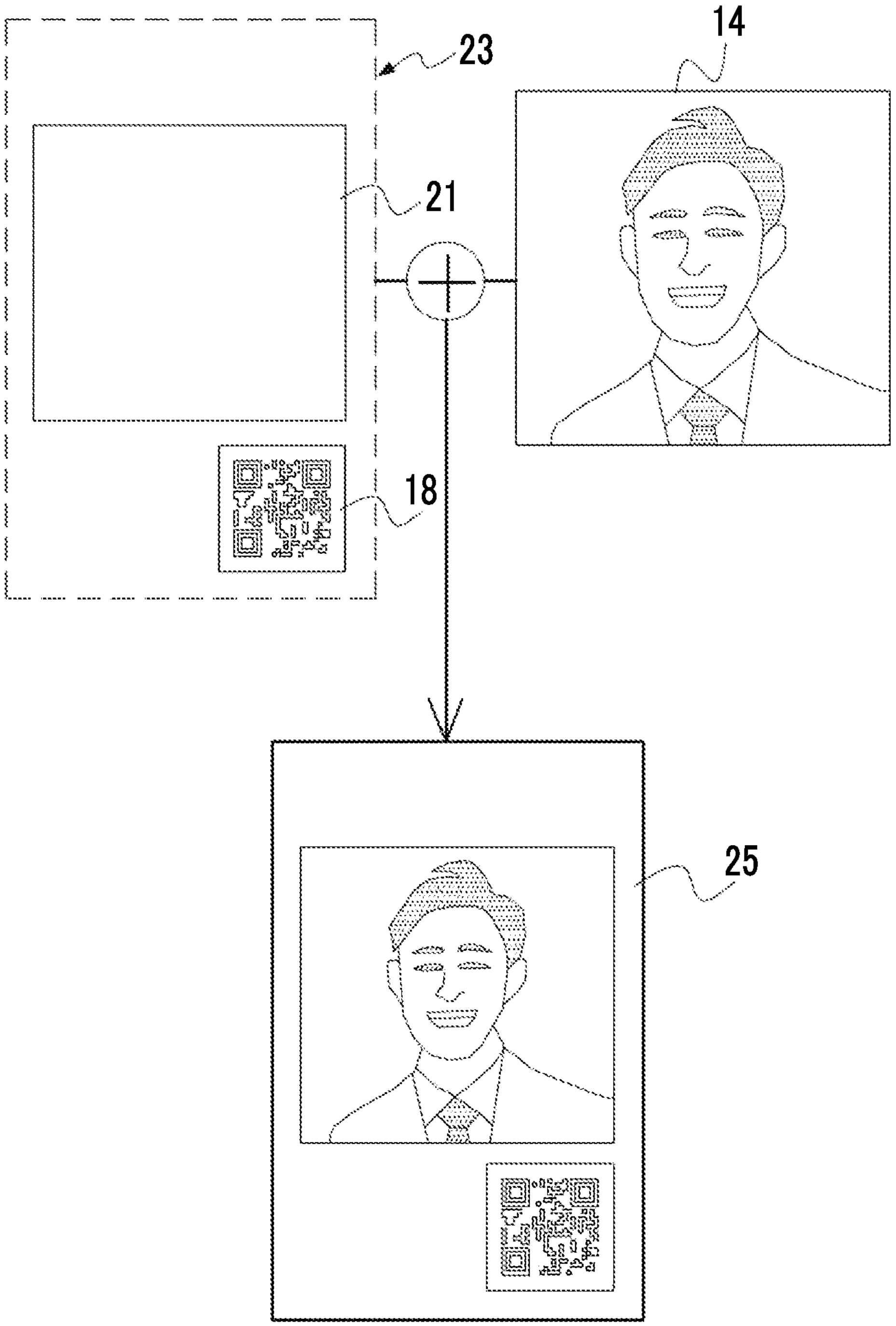
FIG. 4 is a schematic diagram for describing a method of creating an ID image.

As illustrated in FIG. 4 as an example, a frame 21 for fitting the face image 14 is provided at almost a center of the template image 23, and the two-dimensional code 18 is arranged on a lower right side of the frame 21. The ID image 25 is generated by combining the face image 14 at a position of the frame 21 of the template image 23. In the combining, a size of the face image 14 is adjusted in accordance with a size of the frame 21.

Figure 5:
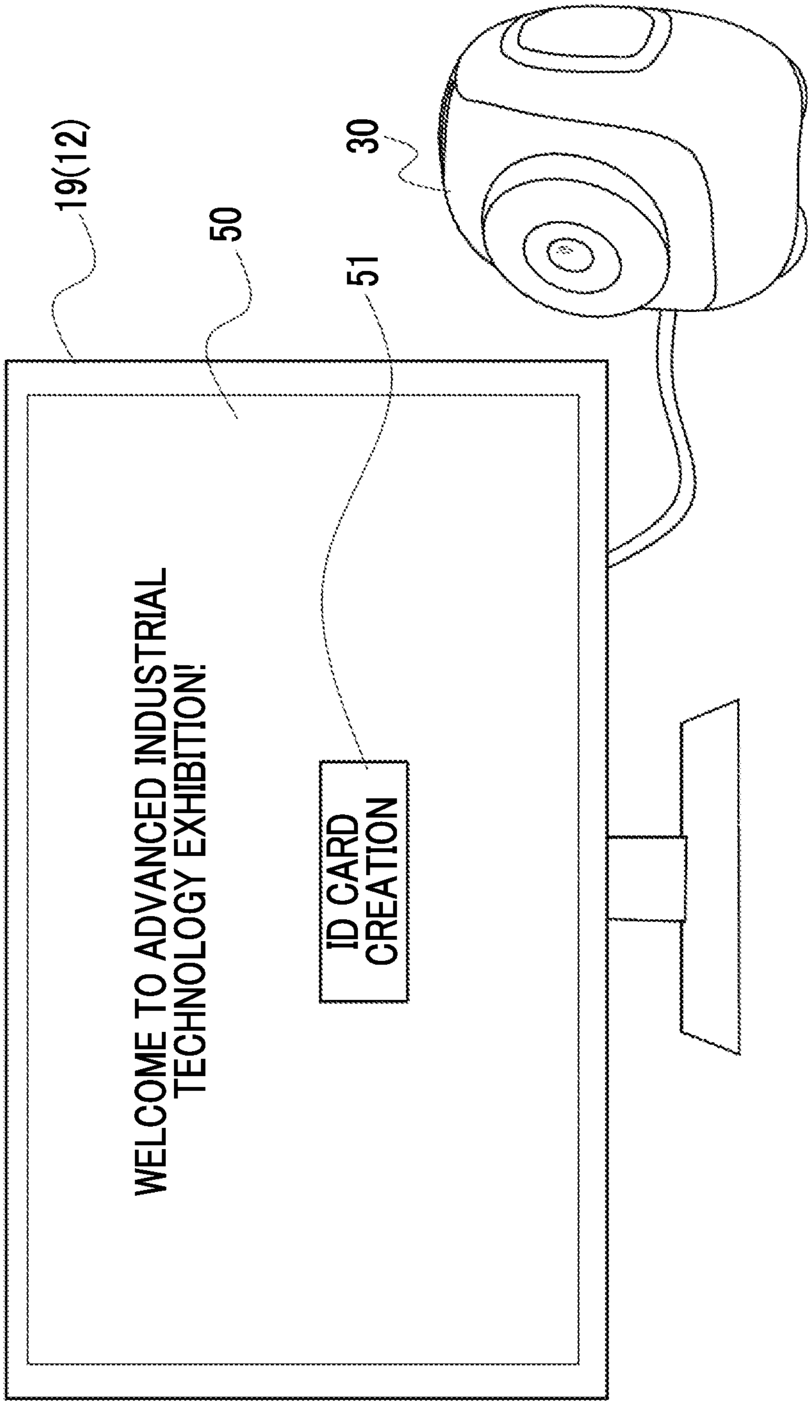
FIG. 5 is a schematic diagram illustrating an example of an initial screen displayed on a touch panel display.

A display screen of the touch panel display 19 of the reception device 10 is illustrated in FIG. 5 to FIG. 8 as an example. The reception device 10 is operated by the participant 13. As illustrated in FIG. 5, for example, a message "Welcome to advanced industrial technology exhibition!" to the participant 13 and an ID card creation button 51 for prompting creation of the ID card 15 are displayed on an initial screen of the touch panel display 19. In addition, in a case where approaching of the participant 13 to the touch panel display 19 is detected by a detection sensor not illustrated, the control circuit 40 outputs a guide voice "Please touch ID card creation button." from the speaker 12.

Figure 6:
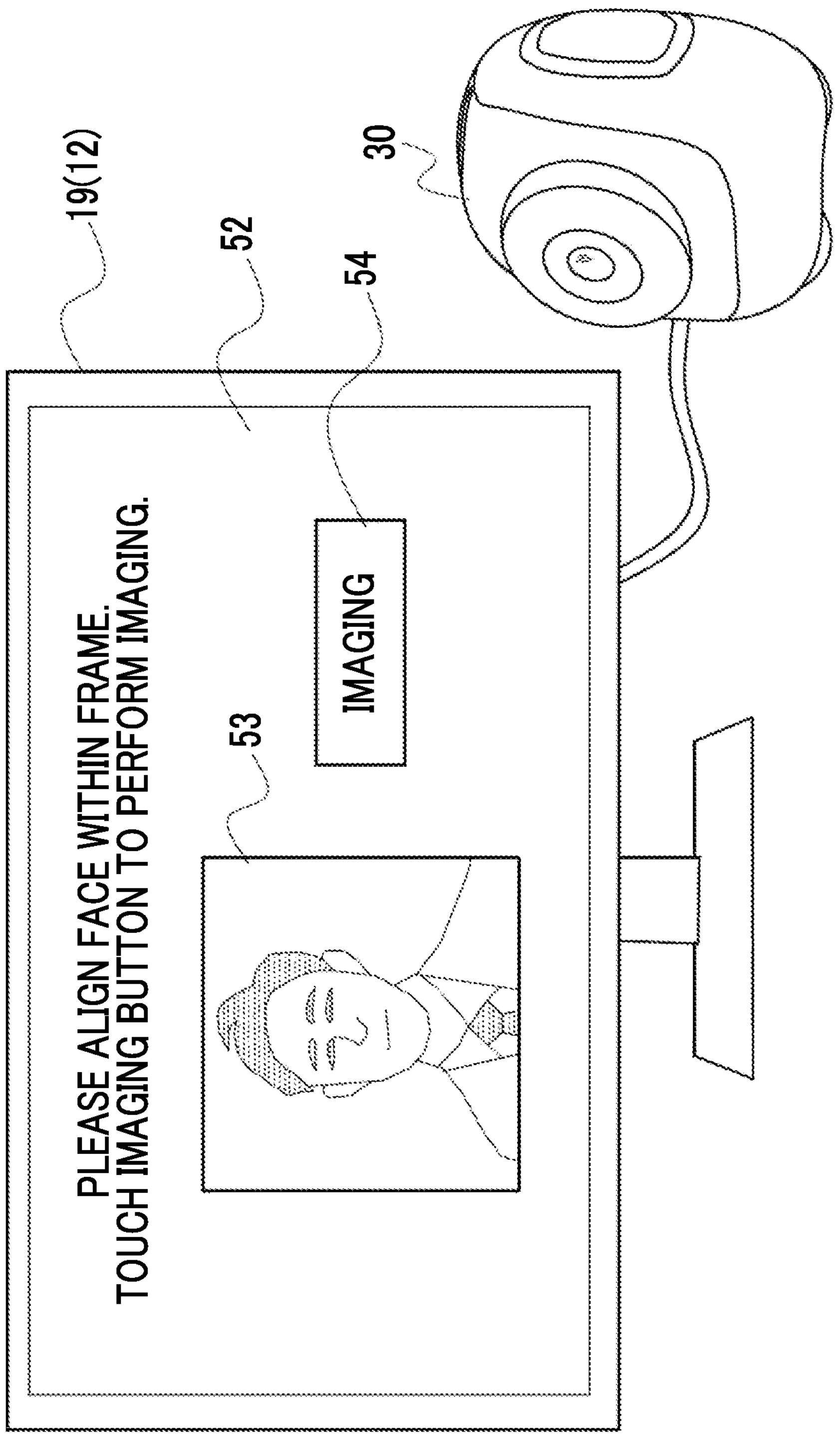
FIG. 6 is a schematic diagram illustrating an example of an imaging screen displayed on the touch panel display.

In a case where the ID card creation button 51 is touched by the participant 13, the control circuit 40 displays an imaging screen 52 on the touch panel display 19 as illustrated in FIG. 6 as an example. The control circuit 40 starts acquiring a live view image by operating the camera 42. A window 53 for displaying the live view image acquired by the camera 42 and an imaging button 54 are displayed on the imaging screen 52. In addition, a message "Please align face within frame. Touch imaging button to perform imaging." for prompting the participant 13 to perform imaging is displayed on the imaging screen 52. Furthermore, the control circuit 40 outputs a guide voice similar to the message from the speaker 12. The participant 13 adjusts a position of the face of the participant 13 and touches the imaging button 54.

Figure 7:
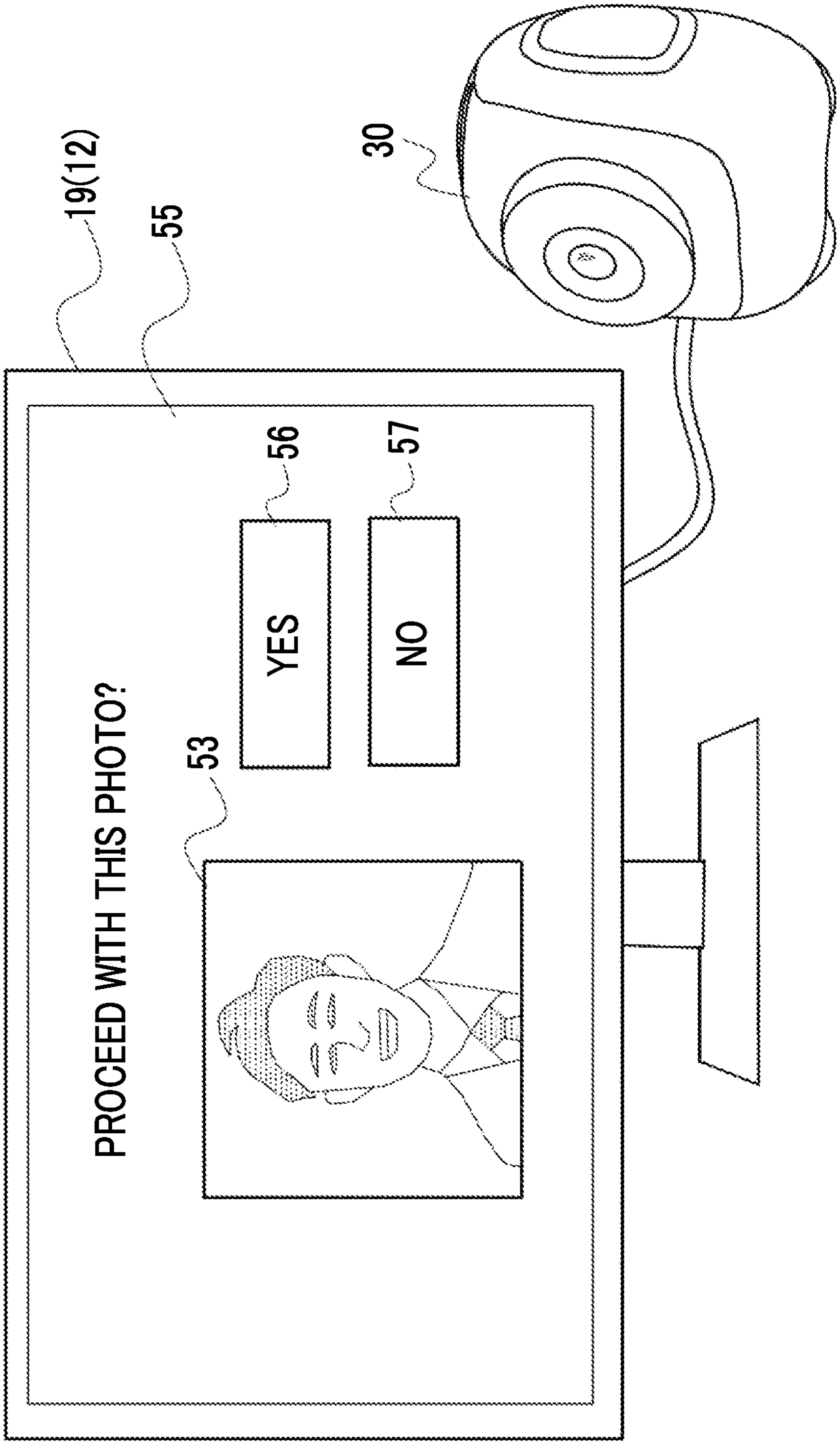
FIG. 7 is a schematic diagram illustrating an example of a check screen displayed on the touch panel display.

In a case where the imaging button 54 is touched by the participant 13, the control circuit 40 acquires a still picture image of one frame acquired (captured) by the camera 42 at a timing of touch as the face image 14 of the participant 13. As illustrated in FIG. 7 as an example, the control circuit 40 displays a check screen 55 on the touch panel display 19. The acquired face image 14 is displayed in the window 53 on the check screen 55. Furthermore, a message "Proceed with this photo?" for prompting the participant 13 to check the acquired face image 14, a "Yes" button 56 representing approval, and a "No" button 57 representing disapproval are displayed on the check screen 55. The participant 13 checks the face image 14 on the check screen 55 and touches the "Yes" button 56 or the "No" button 57.

Figure 8:
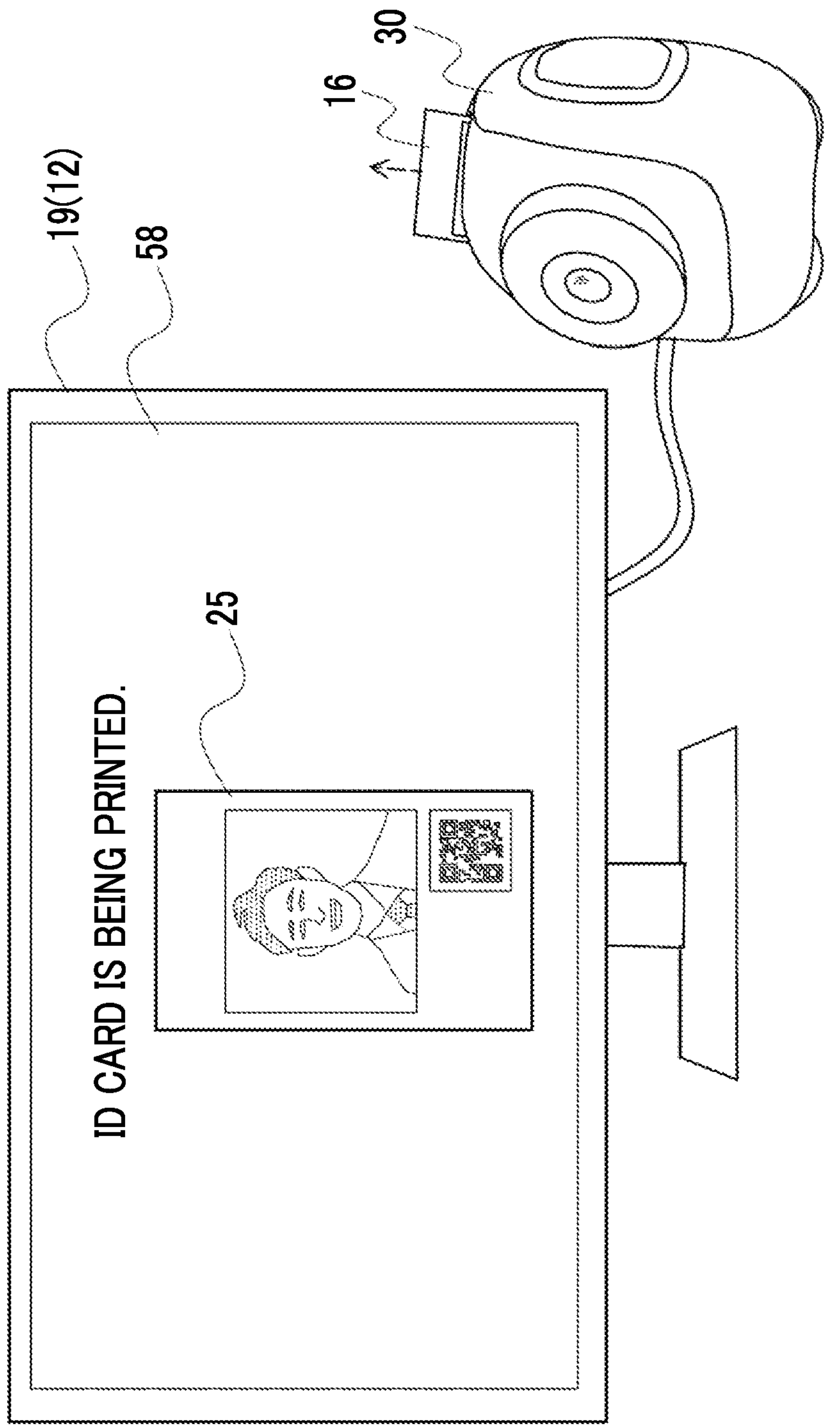
FIG. 8 is a schematic diagram illustrating an example of a preview screen displayed on the touch panel display.

In a case where the "Yes" button 56 is touched by the participant 13, the control circuit 40 creates the ID image 25 by combining the face image 14 with the template image 23 and outputs the created ID image 25 to the printer 35. While the printer 35 prints the ID image 25, the control circuit 40 displays a preview screen 58 on the touch panel display 19 as illustrated in FIG. 8 as an example. The ID image 25 and a message "ID card is being printed." to the participant 13 are displayed on the preview screen 58. The printed instant film 16 is used as the ID card 15 in the event venue.

On the other hand, in a case where the "No" button 57 is touched by the participant 13 on the check screen 55, the control circuit 40 displays the imaging screen 52 illustrated in FIG. 6 again on the touch panel display 19. The control circuit 40 displays the live view image acquired by the camera 42 in the window 53 included in the imaging screen 52. In the same manner as the above, the control circuit 40 displays the check screen 55 illustrated in FIG. 7 on the touch panel display 19 at a timing when the imaging button 54 is touched. Accordingly, the participant 13 can recapture the face image 14 a predetermined number of times (for example, twice).

Figure 9:
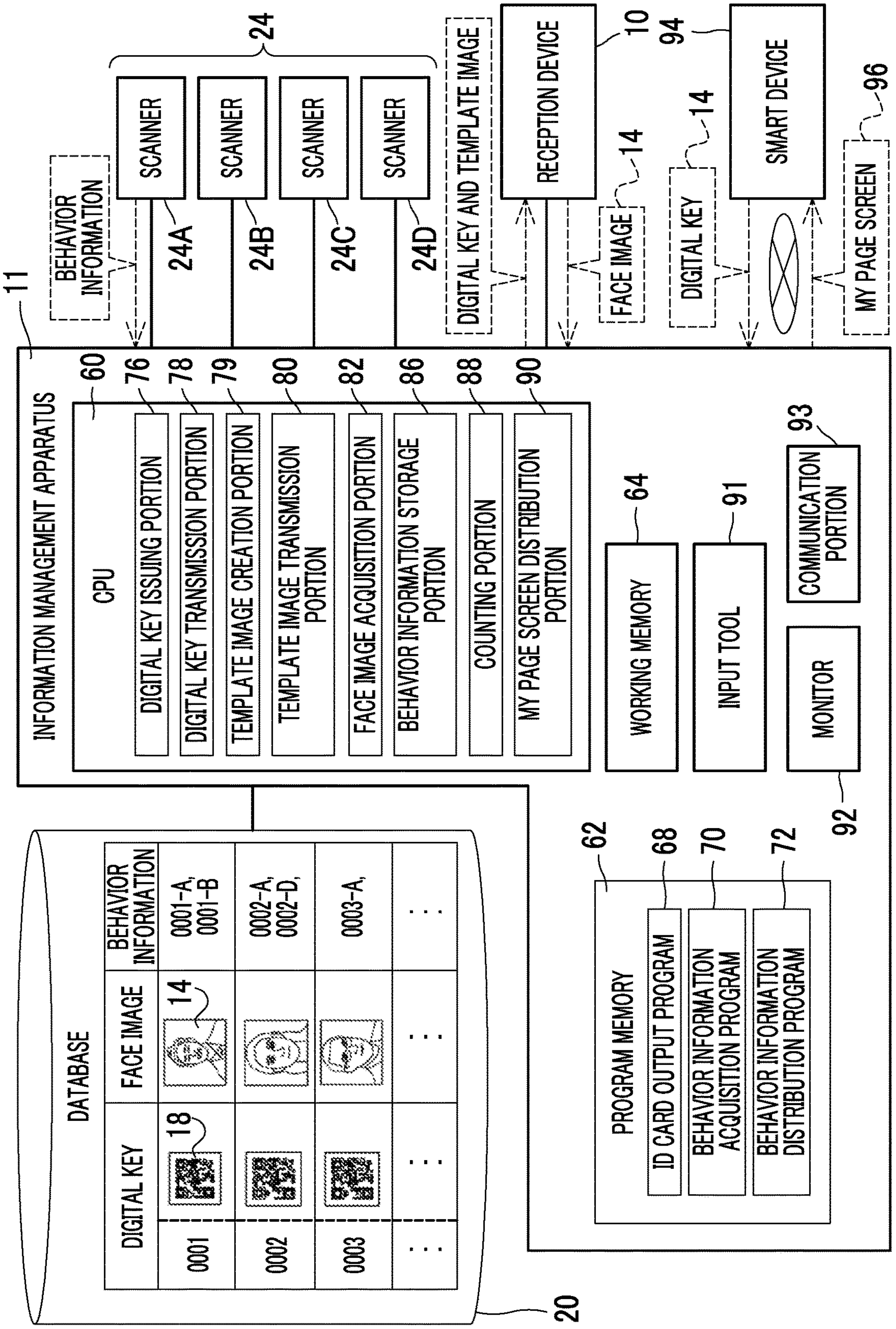
FIG. 9 is a block diagram of an information management apparatus according to the first embodiment.

As illustrated in FIG. 9 as an example, the information management apparatus 11 comprises a CPU 60, a program memory 62, a working memory 64, an input tool 91, a monitor 92, and a communication portion 93. The CPU 60 is an example of a "first processor" according to the embodiment of the disclosed technology.

The CPU 60 generally controls an operation of the information management apparatus 11. The program memory 62 stores an ID card output program 68, a behavior information acquisition program 70, and a behavior information distribution program 72. The working memory 64 is a work memory for executing processing by the CPU 60. The communication portion 93 is a communication interface for communicating with the reception device 10 and the scanner 24 through a local area network (LAN) or a communication cable. The CPU 60 communicates with the reception device 10 and the scanner 24 through the communication portion 93. The communication portion 93 may be a wired interface or a wireless interface. As described above, in a case where there is concern about a communication delay caused by interference between the radio waves as in the event venue, it is preferable that the communication portion 93 is a wired interface.

The CPU 60 loads the ID card output program 68 stored in the program memory 62 into the working memory 64 and executes ID card output processing (refer to FIG. 15) described later. Accordingly, the CPU 60 functions as a digital key issuing portion 76, a digital key transmission portion 78, a template image creation portion 79, a template image transmission portion 80, and a face image acquisition portion 82.

The digital key issuing portion 76 receives the digital key issuing request from the control circuit 40 of the reception device 10 and issues the digital key. For example, the digital key issuing portion 76 assigns a reference number independent of the personal information of the participant in order of reception of the digital key issuing request and issues the assigned reference number as the digital key. In the example illustrated in FIG. 9, the digital key issuing portion 76 issues the digital key "0001" for a first digital key issuing request, a digital key "0002" for a second digital key issuing request, and a digital key "0003" for a third digital key issuing request in this order (refer to the database 20). In addition, the digital key issuing portion 76 stores the issued digital key in the database 20. The digital key transmission portion 78 transmits the digital key issued by the digital key issuing portion 76 to the reception device 10.

The template image creation portion 79 receives a template image request from the reception device 10 and creates the template image 23. The template image transmission portion 80 transmits the template image 23 created by the template image creation portion 79 to the reception device 10.

The face image acquisition portion 82 receives the face image 14 transmitted from the reception device 10. The face image acquisition portion 82 stores the face image 14 in the database 20 in association with the digital key.

In addition, the CPU 60 loads the behavior information acquisition program 70 stored in the program memory 62 into the working memory 64 and executes behavior information acquisition processing (refer to FIG. 16) described later. Accordingly, the CPU 60 functions as a behavior information storage portion 86 and a counting portion 88.

The behavior information storage portion 86 receives the behavior information transmitted from the scanner 24. The behavior information storage portion 86 stores the received behavior information in the database 20 in association with the digital key included in the behavior information.

Figure 10:
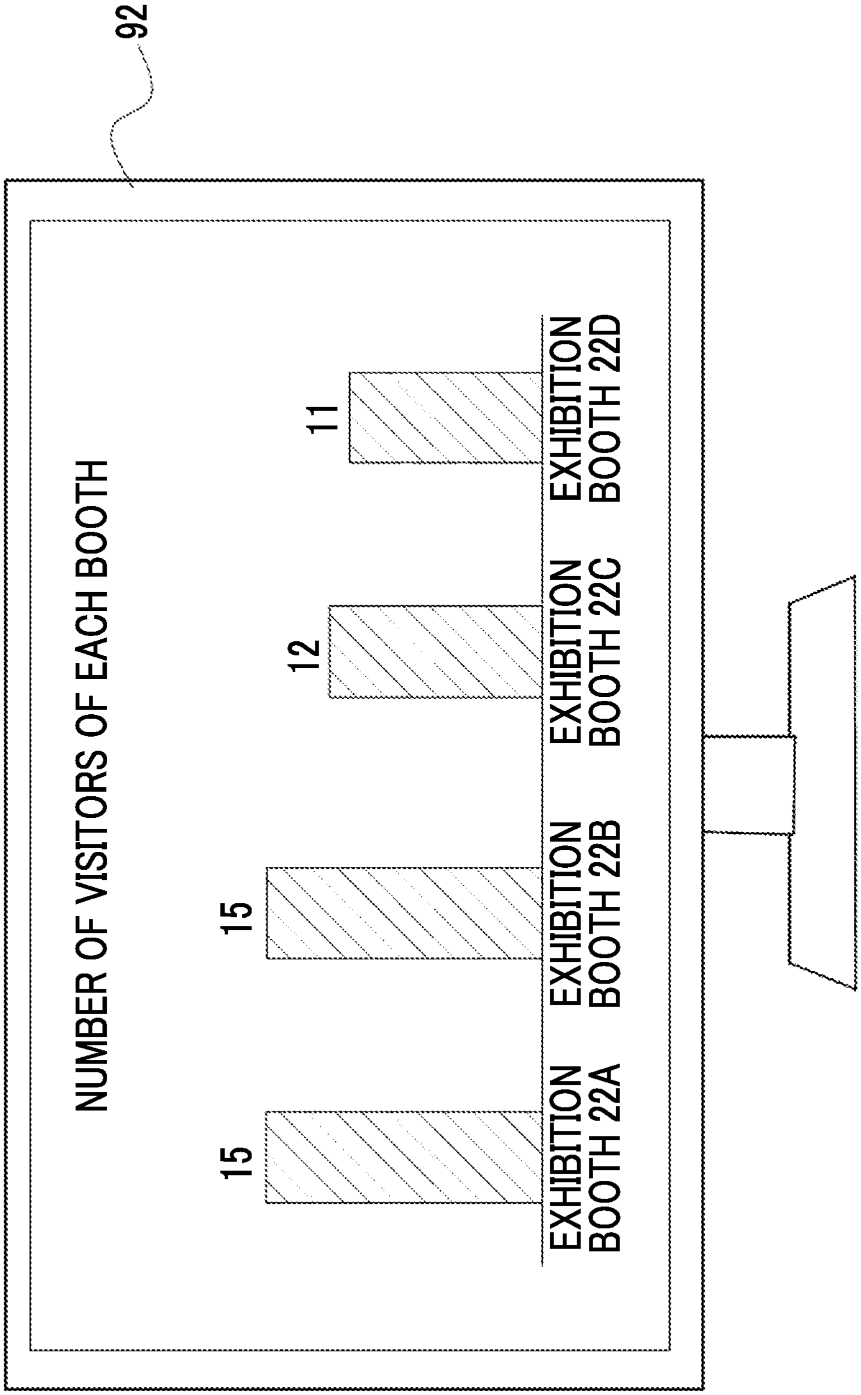
FIG. 10 is a schematic diagram illustrating an example of a counting result of the number of visitors for each exhibition booth.

The counting portion 88 counts the number of participants for each exhibition booth 22 based on the behavior information stored in the database 20 and outputs the number of participants. An example of a counting result of the counting portion 88 is illustrated in FIG. 10. The counting result illustrated in FIG. 10 is a counting result obtained by counting the number of participants 13 who have entered four exhibition booths 22A to 22D for each exhibition booth 22. In the example in FIG. 10, the number of participants 13 is displayed in the form of a bar graph. For example, a screen on which the counting result is displayed is displayed on the monitor 92 of the information management apparatus 11 and is viewed by an organizer or the like of the event. For example, the organizer of the event inputs a counting command into the information management apparatus 11 from the input tool 91 such as a mouse or a keyboard. In the information management apparatus 11, in a case where the CPU 60 receives the counting command, the counting portion 88 executes counting processing.

Figure 11:
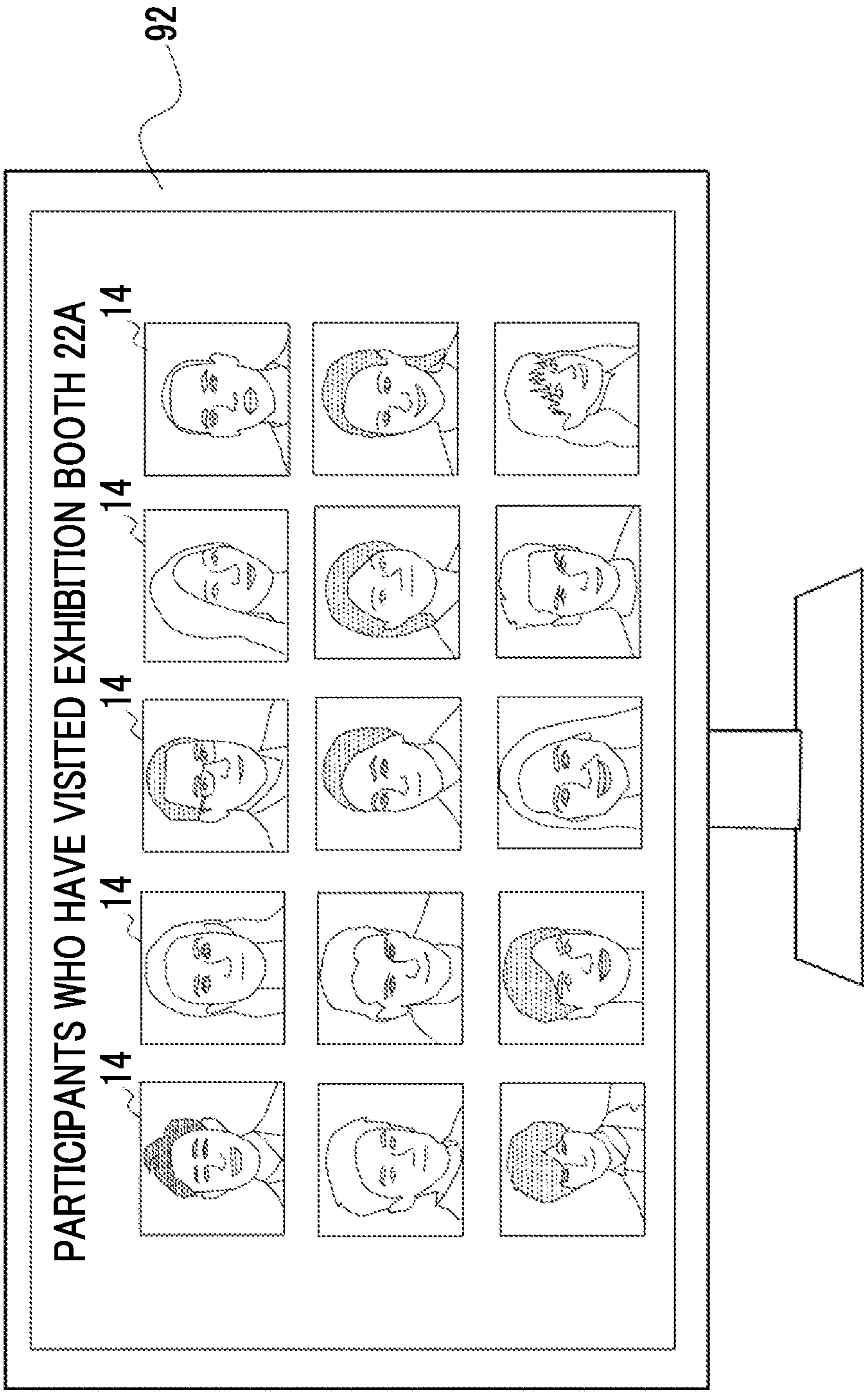
FIG. 11 is a schematic diagram illustrating an aspect in which face images of participants who have entered an exhibition booth 22A are displayed on a monitor of the information management apparatus.
Figure 12:
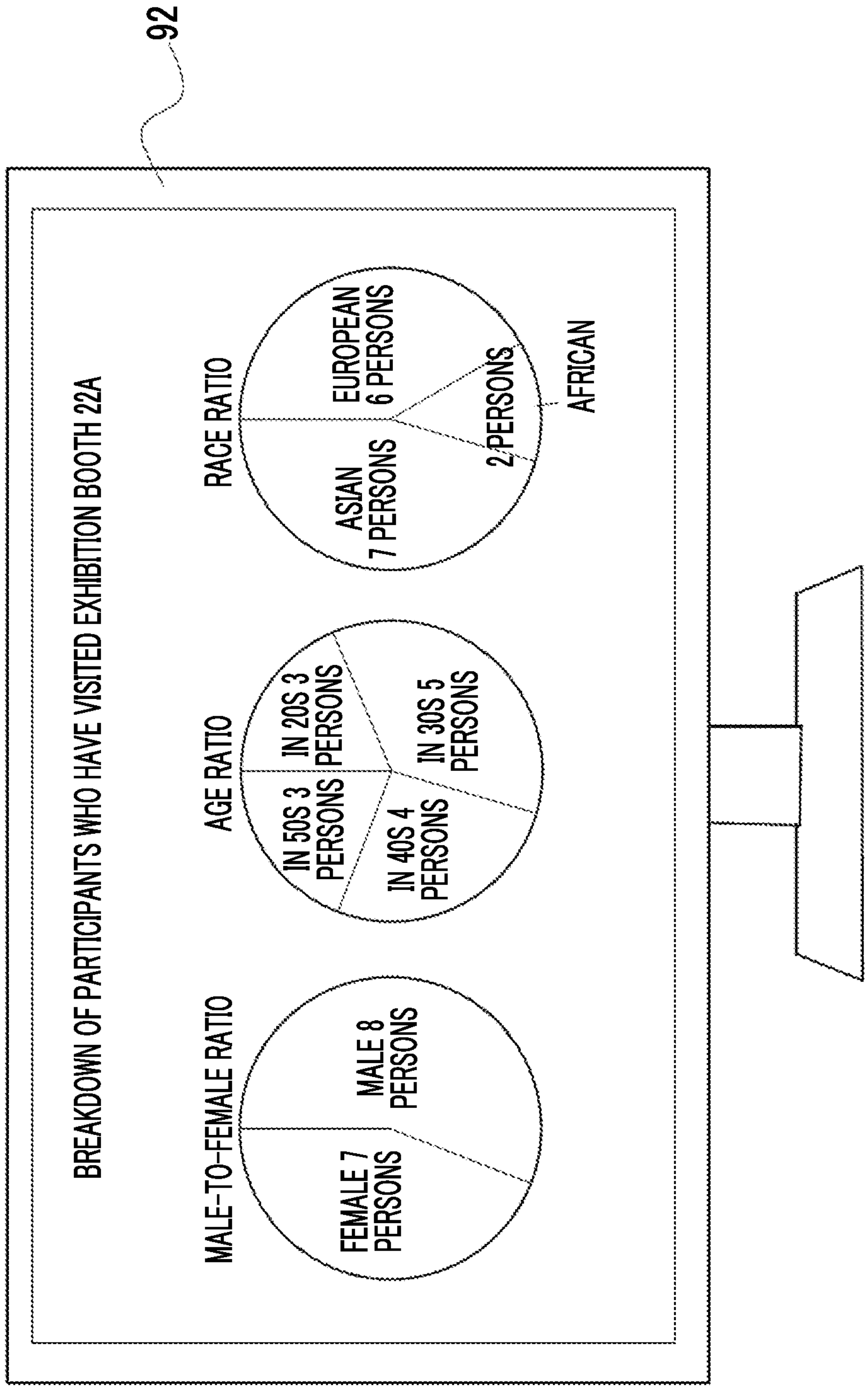
FIG. 12 is a schematic diagram illustrating an aspect in which a breakdown of the participants who have visited the exhibition booth 22A is displayed on the monitor of the information management apparatus.

Furthermore, as illustrated in FIG. 11 as an example, the counting portion 88 comprises a function of generating a list screen of the face images 14 of the participants 13 who have entered each exhibition booth 22 as the counting result. In the example in FIG. 11, a list of the face images 14 of 15 participants 13 who have visited the exhibition booth 22A is displayed. Furthermore, the counting portion 88 estimates a sex, an age, and a race of each participant 13 based on the face images 14 using well-known image recognition technology and classifies the participants 13 based on an estimation result. As illustrated in FIG. 12 as an example, the counting portion 88 calculates a male-to-female ratio, an age ratio, and a race ratio of the participants 13 for each exhibition booth 22 based on the estimation result. In the example in FIG. 12, a calculation result such as the male-to-female ratio, the age ratio, and the race ratio of the participants 13 who have visited the exhibition booth 22A is displayed in the form of a pie graph. For example, the counting result illustrated in FIG. 11 and FIG. 12 is also displayed on the monitor 92 of the information management apparatus 11 and is viewed by the organizer or the like of the event. In the information management apparatus 11, in a case where the CPU 60 receives a list display command, a classification command, and the like, the counting portion 88 executes list screen display processing, classification processing, and the like.

In addition, the CPU 60 loads the behavior information distribution program 72 stored in the program memory 62 into the working memory 64 and executes behavior information distribution processing (refer to FIG. 17) described later. Accordingly, the CPU 60 functions as a my page screen distribution portion 90.

Figure 13:
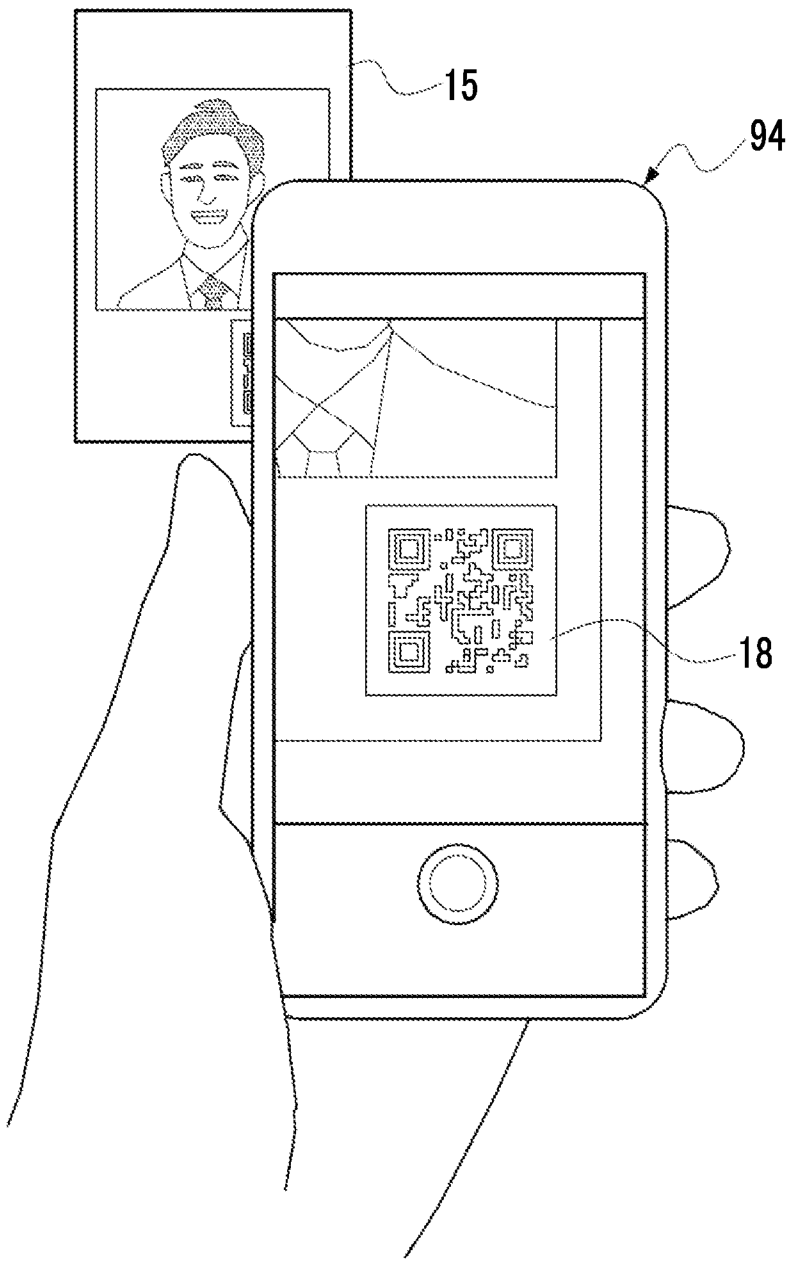
FIG. 13 is a description diagram illustrating an aspect in which a participant images a two-dimensional code printed on an ID card using a camera function of a smart device.

For example, the my page screen distribution portion 90 receives a my page access request transmitted from a smart device 94 of the participant 13 and distributes the my page screen 96 of the participant 13. As illustrated in FIG. 13 as an example, in a case where the participant 13 images the two-dimensional code 18 printed on the ID card 15 using a camera function of the smart device 94, the my page access request is transmitted to the my page screen distribution portion 90 from the smart device 94. The two-dimensional code 18 includes a URL for accessing the my page screen for each participant 13. The smart device 94 reads the URL from the two-dimensional code 18 and transmits the my page access request including the read URL to the information management apparatus 11.

The my page screen distribution portion 90 receives the my page access request and creates a my page screen corresponding to the digital key indicated by the two-dimensional code 18. Specifically, the my page screen distribution portion 90 reads out the face image 14, the behavior information, and the like associated with the digital key of each participant 13 from the database 20 and creates the my page screen 90 for each participant 13. The my page screen distribution portion 90 distributes the created my page screen 90 to the smart device 94.

Figure 14:
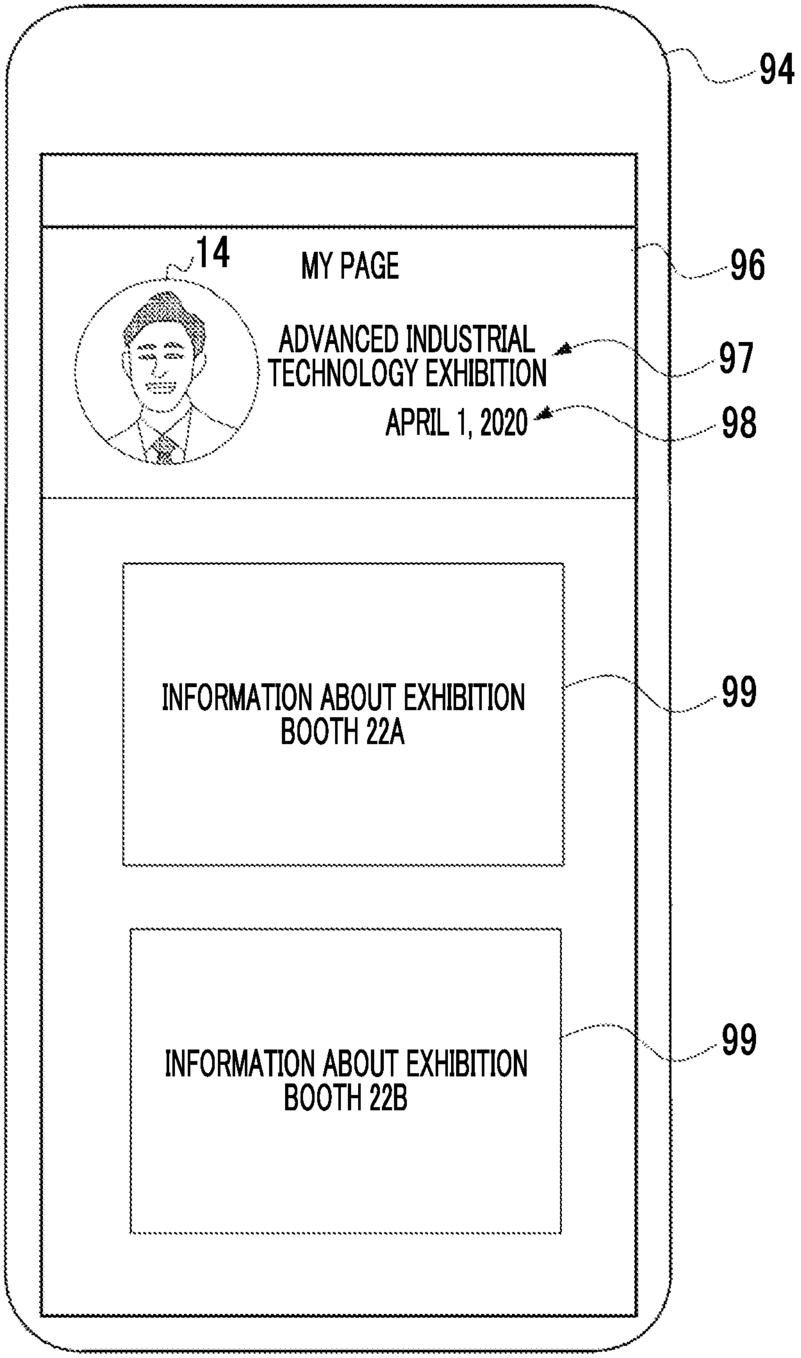
FIG. 14 is a schematic diagram illustrating an example of a my page screen.

For example, the my page screen 96 illustrated in FIG. 14 is displayed on the smart device 94. The face image 14 of the participant 13, an event name 97, a date 98 of the event, and information 99 related to the exhibition booth 22 visited by the participant 13 are displayed on the my page screen 96.

Next, an action of the above configuration will be described with reference to the flowcharts in FIG. 15 to FIG. 17. First, the ID card output processing illustrated in FIG. 15 is performed by executing the ID card output program 68 by the CPU 60 of the information management apparatus 11.

Figure 15:
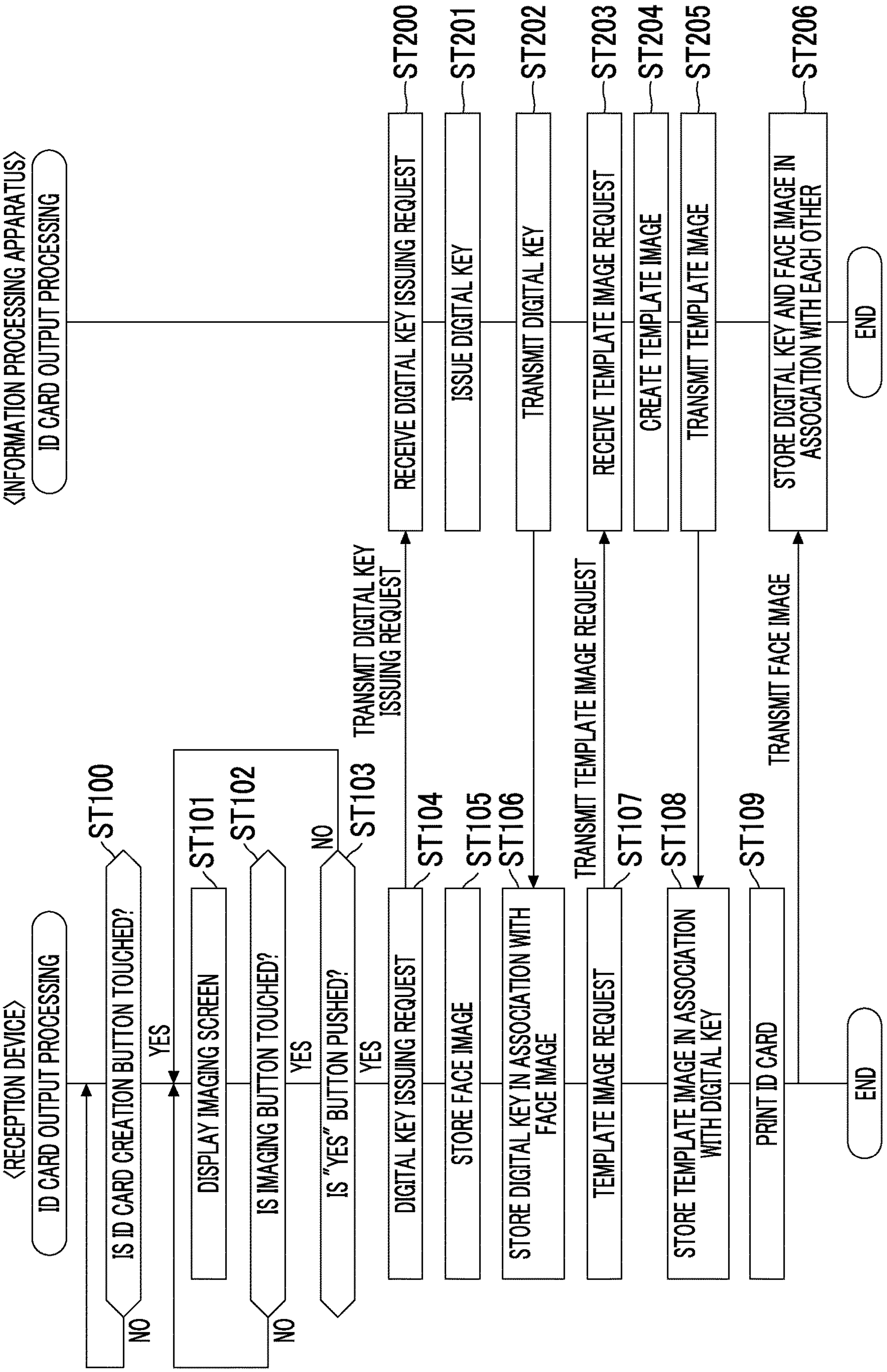
FIG. 15 is a flowchart of ID card output processing.

In the ID card output processing illustrated in FIG. 15, the control circuit 40 of the reception device 10 displays an initial screen 50 illustrated in FIG. 5 on the touch panel display 19. The control circuit 40 determines whether or not the ID card creation button 51 is touched by the participant 13 who has visited the reception counter (step ST100). In a case where the ID card creation button 51 is touched by the participant 13 (YES in step ST100), the control circuit 40 displays the imaging screen 52 illustrated in FIG. 6 on the touch panel display 19 (step ST101).

The control circuit 40 determines whether or not the imaging button 54 is touched by the participant 13 on the imaging screen 52 (step ST102). In a case where the imaging button 54 is touched (YES in step ST102), the control circuit 40 acquires the still picture image of one frame acquired (captured) by the camera 42 at the timing of touch on the imaging button 54 as the face image 14 of the participant 13. The control circuit 40 displays the check screen 55 illustrated in FIG. 7 on the touch panel display 19. The acquired face image 14 is displayed in the window 53 of the check screen 55.

The control circuit 40 of the reception device 10 determines whether or not the “Yes” button 56 is touched by the participant 13 on the check screen 55 (step ST103). In a case where the “Yes” button 56 is not touched, that is, in a case where the “No” button 57 is touched (NO in step ST103), the control circuit 40 displays the imaging screen 52 again on the touch panel display 19. Accordingly, the participant 13 can recapture the face. On the other hand, in a case where the “Yes” button 56 is touched (YES in step ST103), the control circuit 40 transmits the digital key issuing request to the information management apparatus 11 (step ST104). In addition, the control circuit 40 stores the acquired face image 14 in the storage 46 (step ST105).

The digital key issuing portion 76 of the information management apparatus 11 receives the digital key issuing request (step ST200) and issues the digital key (step ST201). Furthermore, the digital key transmission portion 78 transmits the issued digital key to the digital camera 30 including the printer (step ST202).

The control circuit 40 of the reception device 10 receives the digital key transmitted from the digital key transmission portion 78 and stores the digital key in the storage 46 in association with the face image 14 (step ST106). Next, the control circuit 40 transmits the template image request to the information management apparatus 11 (step ST107).

The template image creation portion 79 of the information management apparatus 11 receives the template image request (step ST203) and creates the template image 23 (step ST204). Furthermore, the template image transmission portion 80 transmits the created template image 23 to the digital camera 30 including the printer (step ST205). The control circuit 40 of the digital camera 30 including the printer receives the template image 23. The control circuit 40 stores the template image 23 in association with the digital key indicated by the two-dimensional code 18 included in the template image 23 (step ST108).

The control circuit 40 of the reception device 10 creates the ID image 25 by combining the face image 14 with the corresponding template image 23. The control circuit 40 outputs the ID image 25 to the printer 35. The printer 35 prints the ID image 25 on the instant film 16 (step ST109). While the printer 35 prints the ID card 15, the control circuit 40 displays the preview screen 58 illustrated in FIG. 8 on the touch panel display 19.

Furthermore, the control circuit 40 reads out the face image 14 stored in the storage 46 and transmits the face image 14 to the information management apparatus 11. The face image acquisition portion 82 receives the face image 14. The face image acquisition portion 82 stores the digital key and the face image 14 in the database 20 in association with each other (step ST206).

Performing the ID card output processing once creates the ID card 15 of one participant 13. Performing the ID card output processing for each participant 13 creates the ID card 15 of each participant 13. In the reception device 10, the storage 46 of the digital camera 30 including the printer stores the digital key of each participant 13, the template image 23, and the face image 14 in association with each other.

Figure 16:
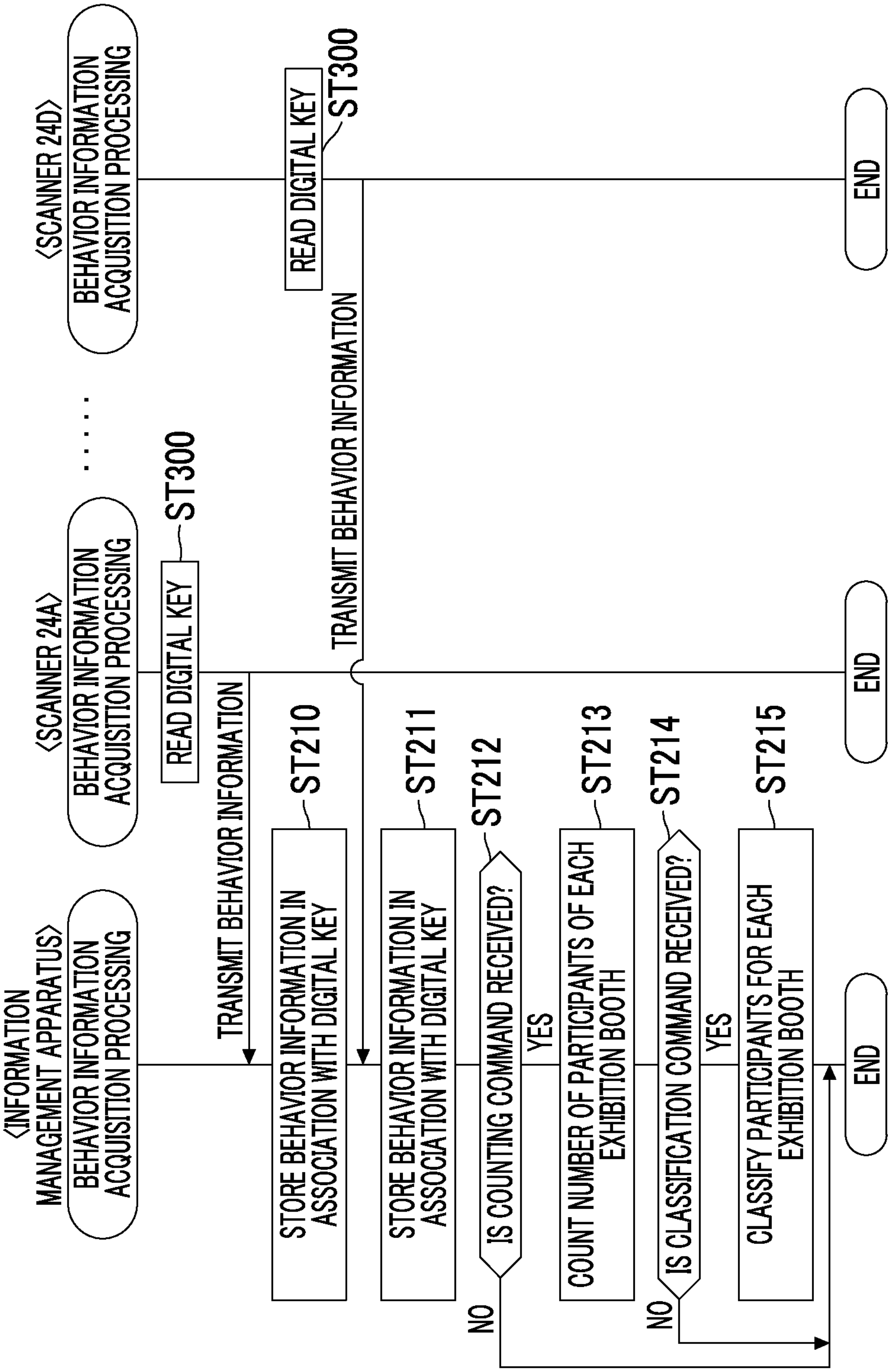
FIG. 16 is a flowchart of behavior information acquisition processing.

Next, the behavior information acquisition processing illustrated in FIG. 16 is performed by executing the behavior information acquisition program 70 by the CPU 60.

As illustrated in FIG. 16, for example, in a case where the participant 13 who has visited the exhibition booth 22A holds the two-dimensional code 18 printed on the ID card 15 on the scanner 24A, the scanner 24A reads the digital key indicated by the two-dimensional code 18 (step ST300). The scanner 24A transmits the behavior information including the read digital key and the scanner ID of the scanner 24A to the information management apparatus 11. The behavior information storage portion 86 of the information management apparatus 11 receives the behavior information. The behavior information storage portion 86 stores the behavior information in the database 20 in association with the digital key included in the behavior information (step ST210).

The plurality of scanners 24 are installed in the event venue. In the same manner as the scanner 24A, each scanner 24 reads the digital key indicated by the two-dimensional code 18 and transmits the behavior information including the read digital key and the scanner ID of the scanner 24 to the information management apparatus 11. In the example in FIG. 16, besides the scanner 24A, a scanner 24D reads the digital key and transmits the behavior information (step ST300). The behavior information storage portion 86 of the information management apparatus 11 receives the behavior information transmitted from the scanner 24D. The behavior information storage portion 86 stores the behavior information in the database 20 in association with the digital key included in the behavior information (step ST211).

The CPU 60 of the information management apparatus 11 determines whether or not the counting command is received (step ST212). In a case where the CPU 60 receives the counting command (YES in step ST212), the counting portion 88 counts the number of participants of each exhibition booth 22 based on the behavior information stored in the database 20 (step ST213). For example, as illustrated in FIG. 10, the counting portion 88 outputs the counting result to the monitor 92.

The CPU 60 determines whether or not the classification command is received (step ST214). For example, the classification command is input from the input tool 91 comprised in the information management apparatus 11 by a planner of the event. In a case where the CPU 60 receives the classification command (YES in step ST214), the counting portion 88 reads out the face images 14 of the participants 13 who have visited each exhibition booth 22 from the database 20. The counting portion 88 estimates the sex, the age, and the race of the participant 13 based on each face image 14 using well-known image recognition technology. For example, as illustrated in FIG. 12, the counting portion 88 outputs the male-to-female ratio, the age ratio, and the race ratio of the participants 13 of each exhibition booth 22 to the monitor 92 based on the estimation result (step ST215). Besides, in a case where the list display command is received, the CPU 60 performs processing of displaying the list screen of the face images 14 of the participants 13 as illustrated in FIG. 11.

Figure 17:
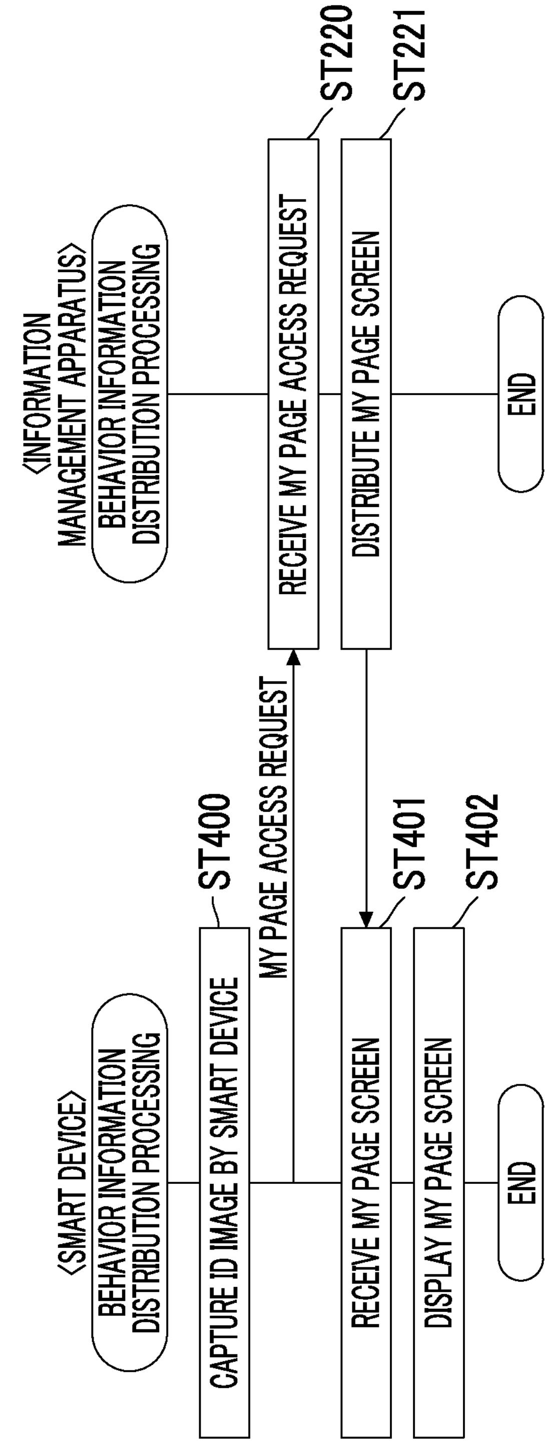
FIG. 17 is a flowchart of behavior information distribution processing.

Next, the behavior information distribution processing illustrated in FIG. 17 is performed by executing the behavior information distribution program 72 by the CPU 60.

As illustrated in FIG. 17, for example, in a case where the participant 13 images the two-dimensional code 18 printed on the ID card 15 by the smart device 94 (refer to FIG. 13), the my page access request is transmitted to the my page screen distribution portion 90 of the information management apparatus 11 from the smart device 94 (step ST400). The my page screen distribution portion 90 receives the my page access request (step ST220), creates the my page screen 96 (refer to FIG. 14) corresponding to the digital key indicated by the two-dimensional code 18, and distributes the created my page screen 96 to the smart device 94 (step ST221). The smart device 94 receives the my page screen 96 (step ST401). The smart device 94 displays the my page screen 96 on a display (step ST402).

As described above, according to the first embodiment, the information management system 2 includes the reception device 10 including the camera 42 and the information management apparatus 11 that is communicably connected to the reception device 10 and manages information about the participant 13. The camera 42 of the reception device 10 images the face of the participant 13 participating in the event. The information management apparatus 11 comprises at least one CPU 60. The CPU 60 receives the issuing request that is the issuing request transmitted from the reception device 10 for the digital key assigned for each participant 13, that is, for each face image 14 (face image 14 captured by the camera 42) acquired by the camera 42, issues the digital key independently of the personal information of the participant 13, and transmits the issued digital key to the reception device 10. The reception device 10 outputs the ID image 25 that includes the face image 14 and the digital key and is the ID image 25 of the participant 13 issued for each participant 13 to the printer 35. The printer 35 creates the ID card 15 by printing the ID image 25 on the instant film 16. In the output (printing) of the ID image 25 by the reception device 10, the CPU 60 of the information management apparatus 11 acquires the face image 14 from the reception device 10. The CPU 60 of the information management apparatus 11 stores the face image 14 and the digital key in the database 20 in association with each other. In the event venue, the plurality of scanners 24 for reading the digital key included in the ID card 15 are arranged. The scanner 24 transmits information including the digital key and the scanner ID to the information management apparatus 11. The CPU 60 of the information management apparatus 11 stores the information from the scanner 24 in the database 20 in association with the digital key as the behavior information representing the behavior of the participant 13. Thus, according to the present configuration, it is possible to collect the behavior information of the participant 13 while reducing an input procedure of the personal information by the participant 13 participating in the event compared to the related art.

The information management apparatus 11 issues the digital key independently of the personal information of the participant 13. Thus, in the reception device 10, the personal information such as a name does not need to be acquired from the participant 13 for creating the ID image 25 usable as a participation identification for the event. Thus, the input procedure of the personal information by the participant can be reduced compared to the related art. A person who feels reluctant to inputting the name or the like easily participates in the event, compared to a case where the input procedure of the personal information is necessary. Thus, it is easy to increase the number of participants of the event. In addition, a reception procedure can be quickly performed, compared to a case where the input procedure of the personal information such as the name by the participant 13 is necessary.

In addition, the CPU 60 of the information management apparatus 11 acquires the face image 14 representing the face of the participant 13 imaged by the camera 42 of the reception device 10 from the reception device 10 and stores the face image 14 and the digital key in the database 20 in association with each other for each participant 13. Acquiring the face image 14 of the participant 13 participating in the event enables visitor management in terms of crime prevention. In addition, since the face image 14 is included in the ID image 25, a face of an owner of the ID image 25 can be visually compared with the face image 14 of the ID image 25. This is also effective as the visitor management in terms of crime prevention.

In addition, since the behavior information of the participant 13 is stored in association with the digital key, the information management apparatus 11 can acquire the behavior information of each participant 13. In addition, in the information management apparatus 11, the behavior information is stored in association with the face image 14 through the digital key. As described above, an approximate attribute of the participant 13 such as the sex and the age can be perceived from the face image 14. The behavior information of the participant 13 corresponding to the sex and the age is information useful for marketing or the like and is, for example, information useful for the organizer of the event and/or an exhibitor or the like of the exhibition booth 22. Accordingly, in a case where the face image 14 can be acquired, for example, information useful for the organizer of the event and/or the exhibitor or the like of the exhibition booth 22 can be obtained without acquiring the personal information such as the name and a department.

In addition, according to the first embodiment, the reception device 10 comprises at least one control circuit 40, and the control circuit 40 creates the ID image 25 by combining the face image 14 of the participant 13 with the template image 23. Thus, according to the present configuration, for example, the reception device 10 can simply create the ID image 25 including the digital key and the face image 14, compared to a case of performing processing using only the face image 14.

In addition, the control circuit 40 of the reception device 10 outputs the ID image 25 to the printer 35. The printer 35 prints the ID image 25 on the instant film 16 and outputs the instant film 16 on which the ID image 25 is printed to an outside as the ID card 15. Thus, according to the present configuration, the reception device 10 can create the ID card 15 that can be carried by the participant 13 of the event.

In addition, the reception device 10 comprises the digital camera 30 including the printer that includes the camera 42 and the printer 35 which prints the face image 14 acquired (captured) by the camera 42 on the instant film 16. Thus, according to the present configuration, for example, the reception device 10 can instantaneously issue the ID card 15 and quickly perform the reception procedure of the event, compared to a case where a printer is installed in a location separated from the camera 42.

In addition, the ID image 25 may be output to the smart device 94 of the participant 13 instead of being printed on the instant film 16. However, the ID image 25 usable as the participant identification can also be issued to the participant 13 not having the smart device 94 by creating the ID card 15.

In addition, in the information management apparatus 11, the digital key is included in the ID image 25 in the form of the two-dimensional code 18. Thus, according to the present configuration, for example, a security level of the ID image 25 can be increased, compared to a case where the digital key is a one-dimensional code.

In addition, the CPU 60 of the information management apparatus 11 transmits the template image 23 to be combined with the face image 14 to the reception device 10 in addition to the digital key. Thus, according to the present configuration, processing required for creating the template image 23 by the reception device 10 can be eliminated.

In addition, as illustrated in FIG. 10 to FIG. 12, the CPU 60 of the information management apparatus 11 counts the behavior information of the plurality of participants 13 and outputs the counted counting result. Thus, according to the present configuration, for example, the CPU 60 of the information management apparatus 11 can process the behavior information to information useful for the organizer of the event and/or the exhibitor or the like of the exhibition booth 22 by counting the behavior information of the participants 13 for each exhibition booth 22 in the event venue, compared to a case of directly outputting the behavior information of the plurality of participants 13.

In addition, as illustrated in FIG. 11 as an example, the CPU 60 of the information management apparatus 11 outputs the counting result including the face image 14 as the counting result. Thus, according to the present configuration, for example, the CPU 60 can process the counting result to information useful for the organizer of the event and/or the exhibitor or the like of the exhibition booth 22, compared to a case of outputting only the behavior information of the plurality of participants 13 as the counting result.

In addition, the CPU 60 of the information management apparatus 11 receives a distribution request including the digital key from the participant 13 and distributes the behavior information of the participant 13 corresponding to the digital key. Thus, according to the present configuration, the participant 13 can view a behavior history of the participant 13 in the event on the smart device 94. For example, viewing the behavior history is convenient in a case where the participant 13 has to summarize a report for reporting participation in the event.

In the above example, while an example in which the digital key is included in the ID image 25 as the two-dimensional code 18 is described, the digital key may be included in the ID image 25 not in the form of the two-dimensional code 18. For example, the reference number of the digital key "0001" in the above example may be directly included in the ID image 25. Since the digital key is not information obtained by coding the personal information such as the name and is issued independently of the personal information, there is little concern about leakage of the personal information even in a case where the digital key is not coded.

Second Embodiment

In a second embodiment, the information management apparatus 11 acquires and counts selection information representing a selection of each participant 13 as the behavior information of each participant 13. Hereinafter, the second embodiment will be described mainly based on differences from the first embodiment.

Figure 18:
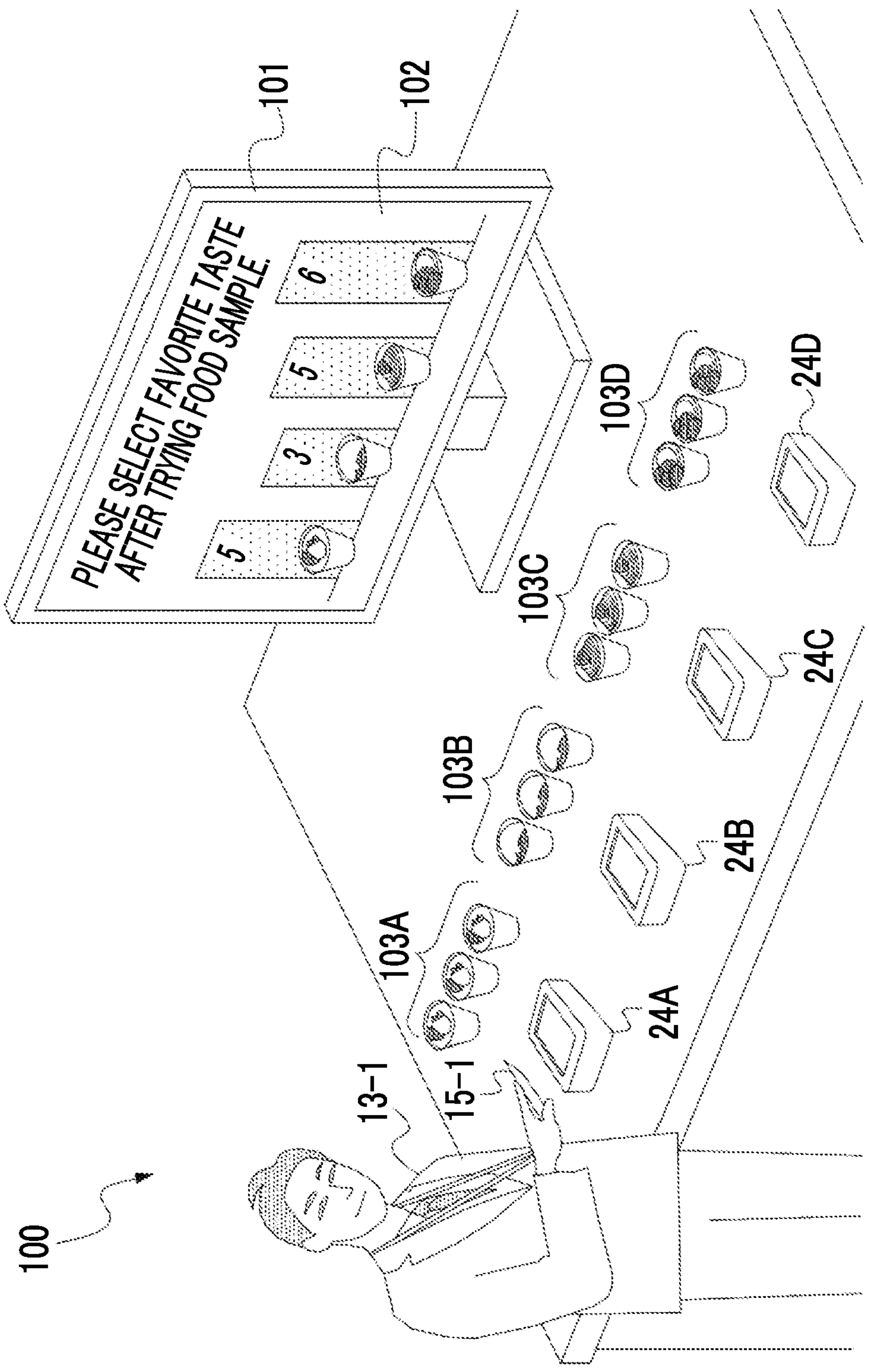
FIG. 18 is a schematic diagram illustrating an example of a food sample booth according to a second embodiment.

In the second embodiment, a food sample booth 100 is installed in the event venue. As illustrated in FIG. 18 as an example, a monitor 101, a plurality of types, for example, four types, of food samples 103A to 103D, and four scanners 24A to 24D corresponding to the four types of food samples 103A to 103D are installed in the food sample booth 100. A selection screen 102 is displayed on the monitor 101. A message "Please select favorite taste after trying food sample." for prompting a participant 13-1 to make a selection and a selection result of other participants to the current point in time are displayed on the selection screen 102. The four scanners 24A to 24D will be referred to as the "scanner 24" unless otherwise necessary to distinguish. The participant 13-1 is a participant to which the digital key "0001" is assigned and will be distinguished from other participants 13. In addition, the participant 13-1 will be referred to as the "participant 13" in the same manner as the other participants unless otherwise necessary to distinguish. Hereinafter, a face image of the participant 13-1 will be designated by reference numeral 14-1. An ID card of the participant 13-1 will be designated by reference numeral 15-1, and a two-dimensional code of the participant 13-1 will be designated by reference numeral 18-1.

The participant 13-1 tries the food samples 103A to 103D and selects a favorite taste. Specifically, the participant 13-1 holds the two-dimensional code 18-1 printed on the ID card 15-1 of the participant 13-1 on a scanner corresponding to the favorite taste among the scanners 24A to 24D. The scanner reads a digital key indicated by the two-dimensional code 18-1. In the example in FIG. 18, the participant 13-1 reads the digital key indicated by the two-dimensional code 18-1 by the scanner 24A corresponding to the food sample 103A. The selection of the participant 13-1 adds "1" to a selection result of the food sample 103A displayed on the selection screen 102. The food samples 103A to 103D will be referred to as a "food sample 103" unless otherwise necessary to distinguish.

Figure 19:
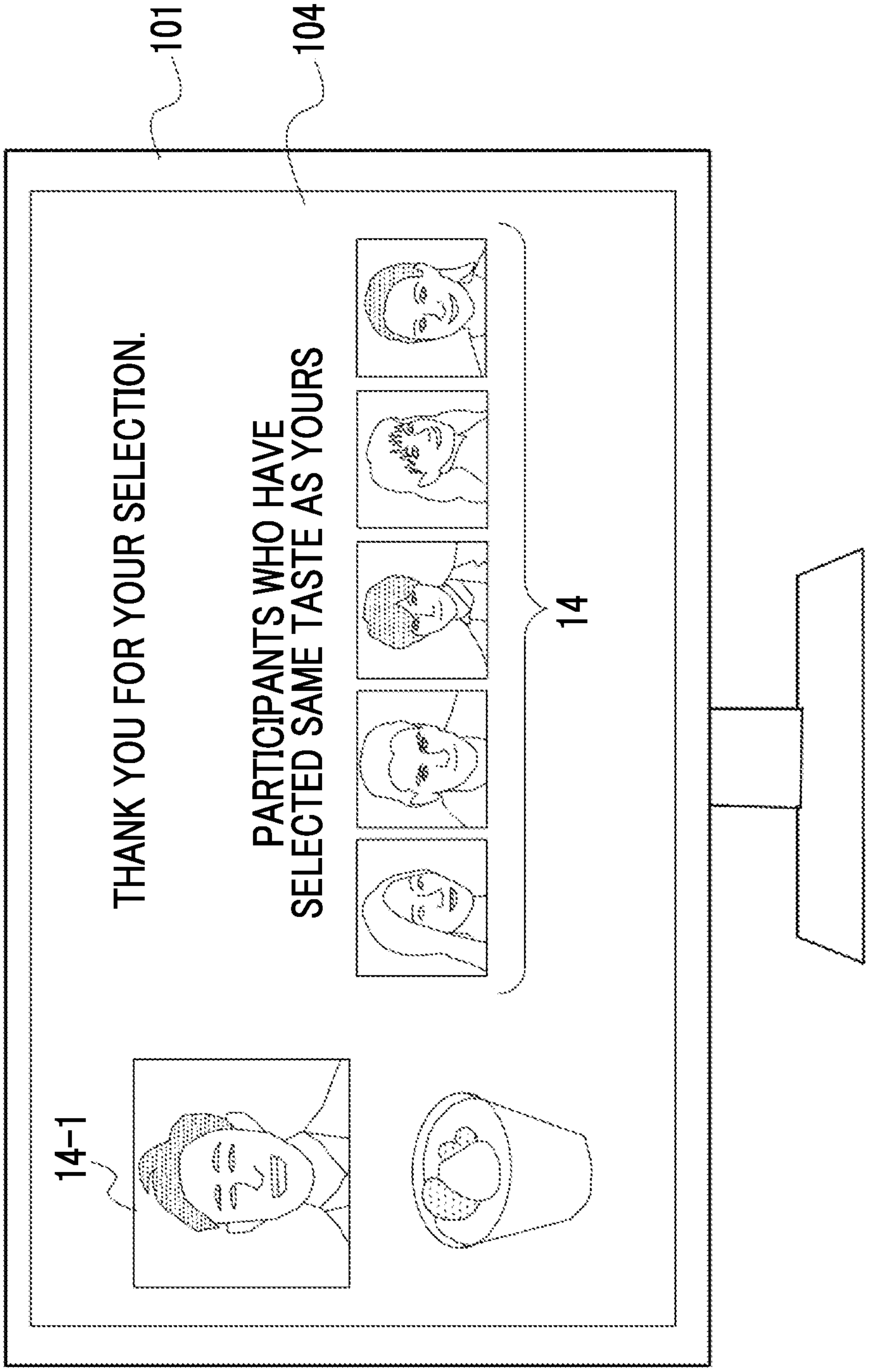
FIG. 19 is a schematic diagram illustrating an example of a selection result display screen.

In a case where the selection is finished, for example, display of the monitor 101 switches to a selection result display screen 104 illustrated in FIG. 19. A message "Thank you for your selection." to the participant 13-1, the face image 14-1 of the participant 13-1, and furthermore, the face images 14 of the other participants 13 who have selected the food sample 103A so far are displayed on the selection result display screen 104.

Figure 20:
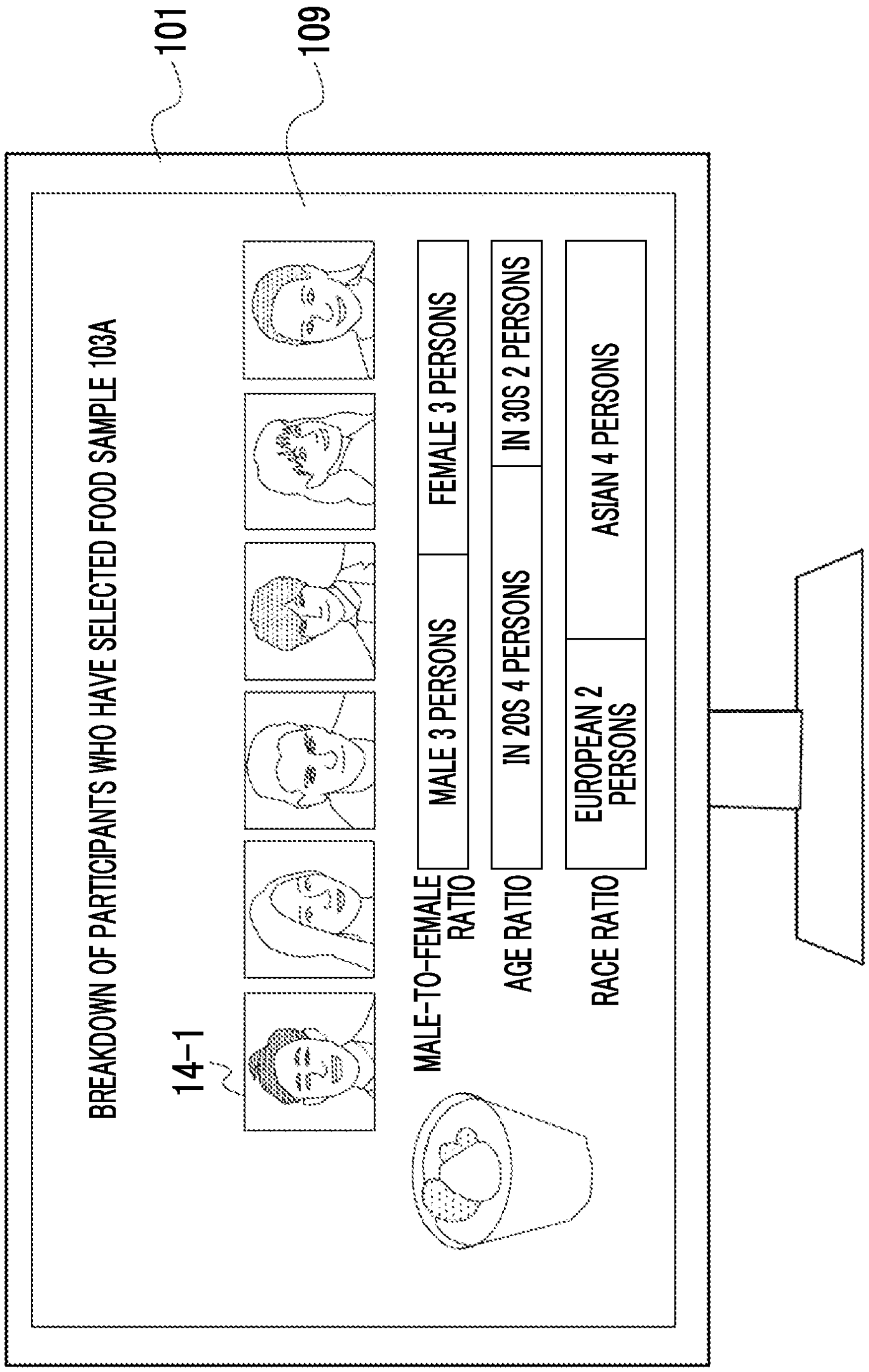
FIG. 20 is a schematic diagram illustrating an example of a classification result display screen.

Next, for example, the display of the monitor 101 switches to a classification result display screen 109 illustrated in FIG. 20. A breakdown, that is, the male-to-female ratio, the age ratio, and the race ratio, of the participants 13 who have selected the food sample 103A is displayed on the classification result display screen 109. The sex, the age, and the race of each participant 13 are estimated from the face images 14 using well-known image recognition technology.

Figure 21:
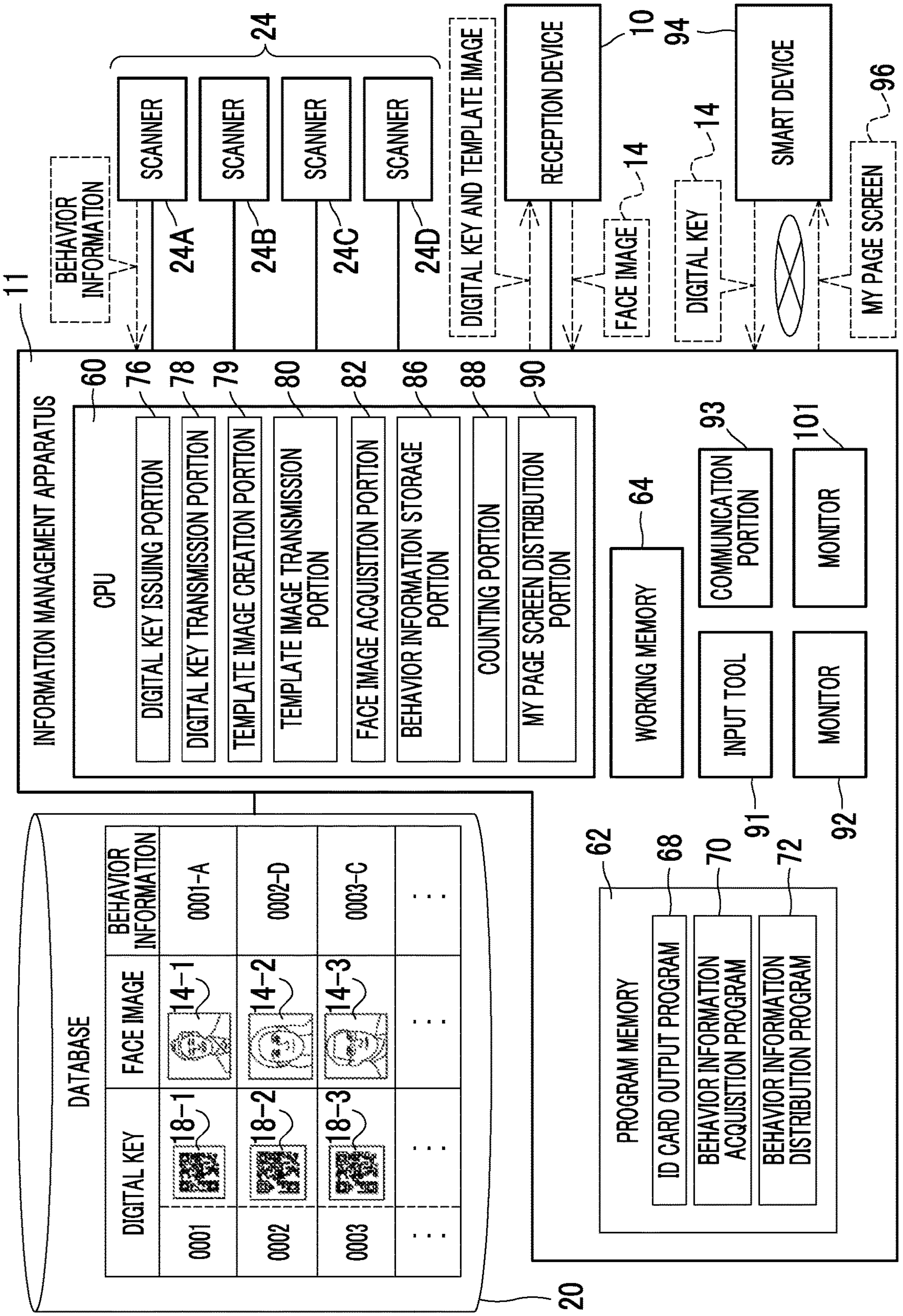
FIG. 21 is a block diagram of an information management apparatus according to the second embodiment.

As illustrated in FIG. 21 as an example, a configuration of the information management apparatus 11 of the second embodiment is similar to FIG. 9, and addition of the monitor 101 illustrated in FIG. 18 and the like in addition to the monitor 92 is a difference.

As the behavior information transmitted from the scanner 24 each time the participant 13 holds the two-dimensional code 18 on the scanner 24, the behavior information storage portion 86 receives the selection information about the food samples 103A to 103D illustrated in FIG. 18 as the behavior information. The selection information (an example of the behavior information) is information representing the selection of the participant 13-1. The selection information includes the digital key indicated by the two-dimensional code 18 and the scanner ID. The behavior information storage portion 86 stores the received selection information (an example of the behavior information) in the database 20 in association with the digital key included in the selection information. For example, in the example in FIG. 18, the behavior information storage portion 86 receives "0001-A" including the digital key "0001" of the participant 13-1 and the scanner ID "A" of the scanner 24A from the scanner 24A as the selection information. The behavior information storage portion 86 stores the received selection information (an example of the behavior information) in the database 20 in association with the digital key "0001" included in the selection information (an example of the behavior information).

The counting portion 88 counts and outputs the selection result of each food sample 103 based on the selection information (an example of the behavior information) stored in the database 20. For example, as illustrated in FIG. 18, the counting portion 88 counts the number of participants 13 who have selected each food sample 103 and outputs the counting result to the monitor 101. In the example in FIG. 18, the counting result is displayed on the monitor 101 in the form of a bar graph.

In addition, as illustrated in FIG. 19, the counting portion 88 outputs the face images 14 of the participants 13 who have selected each food sample 103 to the monitor 101. In the example in FIG. 19, the face images 14 of the participants 13 who have selected the food sample 103A are displayed on the monitor 101. Furthermore, the counting portion 88 estimates the sex, the age, and the race of each participant 13 based on the face images 14 using well-known image recognition technology. As illustrated in FIG. 20, the counting portion 88 outputs the male-to-female ratio, the age ratio, and the race ratio of the participants 13 who have selected each food sample 103 to the monitor 101 based on the estimation result.

As described above, according to the second embodiment, the information management apparatus 11 stores and counts the selection information representing the selection of each participant 13 as the behavior information of each participant 13. Thus, the information management system 2 according to the second embodiment can be used as a voting system that counts a selection behavior of the participant 13.

Third Embodiment

The information management system 2 according to a third embodiment comprises a participant management function in terms of crime prevention using a surveillance camera. In the information management system 2 according to the third embodiment, the surveillance camera is installed near the scanner 24 of each exhibition booth 22. The surveillance camera images a face of a person holding the ID card 15 on the scanner 24. For example, the information management apparatus 11 prevents a certain person from using the ID card 15 of another person by impersonating a holder of the ID card 15, by comparing the face of the person imaged by the surveillance camera with the face image 14 stored in the database 20.

Figure 22:
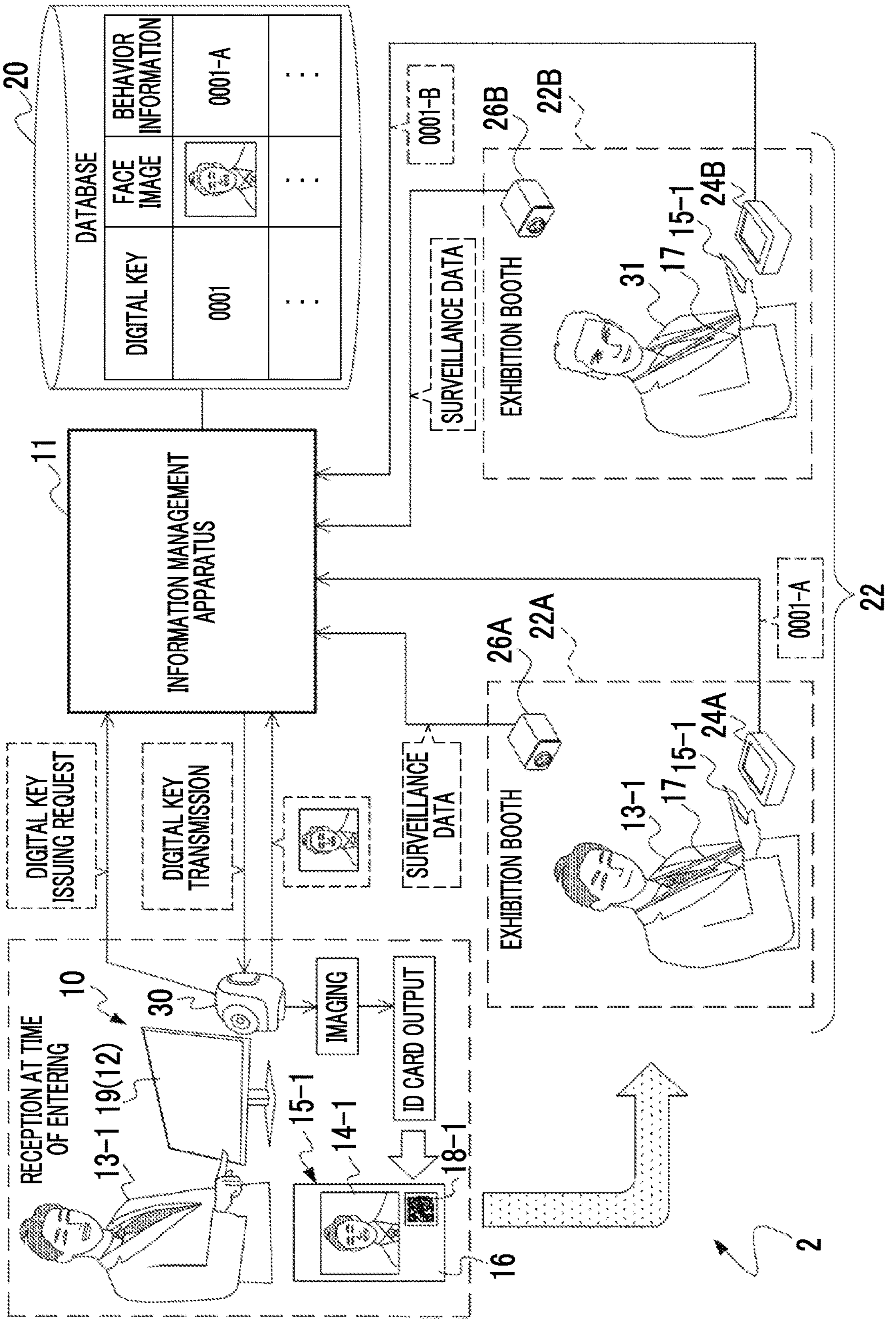
FIG. 22 is a schematic diagram of an information management system according to a third embodiment.

As illustrated in FIG. 22 as an example, a surveillance camera 26A is installed near above the scanner 24A in the exhibition booth 22A. In the same manner, a surveillance camera 26B is comprised near above the scanner 24B in the exhibition booth 22B. While illustration is not provided, a surveillance camera 26C is comprised in the exhibition booth 22C, and a surveillance camera 26D is comprised in the exhibition booth 22D. The surveillance cameras 26A to 26D will be referred to as a "surveillance camera 26" unless otherwise necessary to distinguish. The surveillance camera 26 is arranged at a position at which the face of the person holding the two-dimensional code 18 on the scanner 24 can be imaged.

The participant 13-1 creates the ID card 15-1 at the reception counter. The digital key "0001" is assigned to the participant 13-1. The face image 14-1 of the participant 13-1 and the two-dimensional code 18-1 obtained by coding the digital key "0001" are printed on the ID card 15-1.

The participant 13-1 reads the two-dimensional code 18-1 by the scanner 24A installed in the exhibition booth 22A. The scanner 24A transmits the behavior information "0001-A" including the digital key "0001" indicated by the read two-dimensional code 18-1 and the scanner ID "A" of the scanner 24A to the information management apparatus 11.

In addition, the surveillance camera 26A installed in the exhibition booth 22A acquires a video of the participant 13-1 reading the two-dimensional code 18-1 by the scanner 24A as surveillance data. The surveillance camera 26A transmits the acquired surveillance data to the information management apparatus 11. The information management apparatus 11 detects the face image of the participant 13-1 who has read the two-dimensional code 18-1 by the scanner 24A from the received surveillance data using well-known face detection technology.

The information management apparatus 11 compares the face image detected from the surveillance data with the face image 14-1 stored in the database 20 in association with the digital key "0001" included in the behavior information "0001-A". In a case where the detected face image matches the face image 14-1 as a result of comparison, the information management apparatus 11 stores the behavior information "0001-A" in the database 20 in association with the digital key "0001". In this case, since the detected face image matches the face image 14-1, the behavior information "0001-A" is stored in the database 20.

On the other hand, in the exhibition booth 22B, another person 31 reads the two-dimensional code 18-1 by the scanner 24B using the ID card 15-1 of the participant 13-1. The scanner 24B transmits the behavior information "0001-B" including the digital key "0001" indicated by the read two-dimensional code 18-1 and the scanner ID "B" of the scanner 24B to the information management apparatus 11.

In addition, the surveillance camera 26B installed in the exhibition booth 22B acquires a video of the person 31 reading the two-dimensional code 18-1 by the scanner 24B as the surveillance data. The surveillance camera 26B transmits the acquired surveillance data to the information management apparatus 11. The information management apparatus 11 detects a face image of the person 31 from the received surveillance data.

The information management apparatus 11 compares the face image detected from the surveillance data with the face image 14-1 stored in the database 20 in association with the digital key "0001" included in the behavior information "0001-B". In this case, the face image detected from the surveillance data does not match the face image 14-1. In a case where the detected face image does not match the face image 14-1, the information management apparatus 11 determines that the person 31 impersonates the participant 13-1, and does not store the behavior information "0001-B" in the database 20. Furthermore, for example, in a case where a gate is installed at an entrance of the exhibition booth 22B, the information management apparatus 11 prohibits the person 31 impersonating another person from entering by performing a control of not opening the gate.

Figure 23:
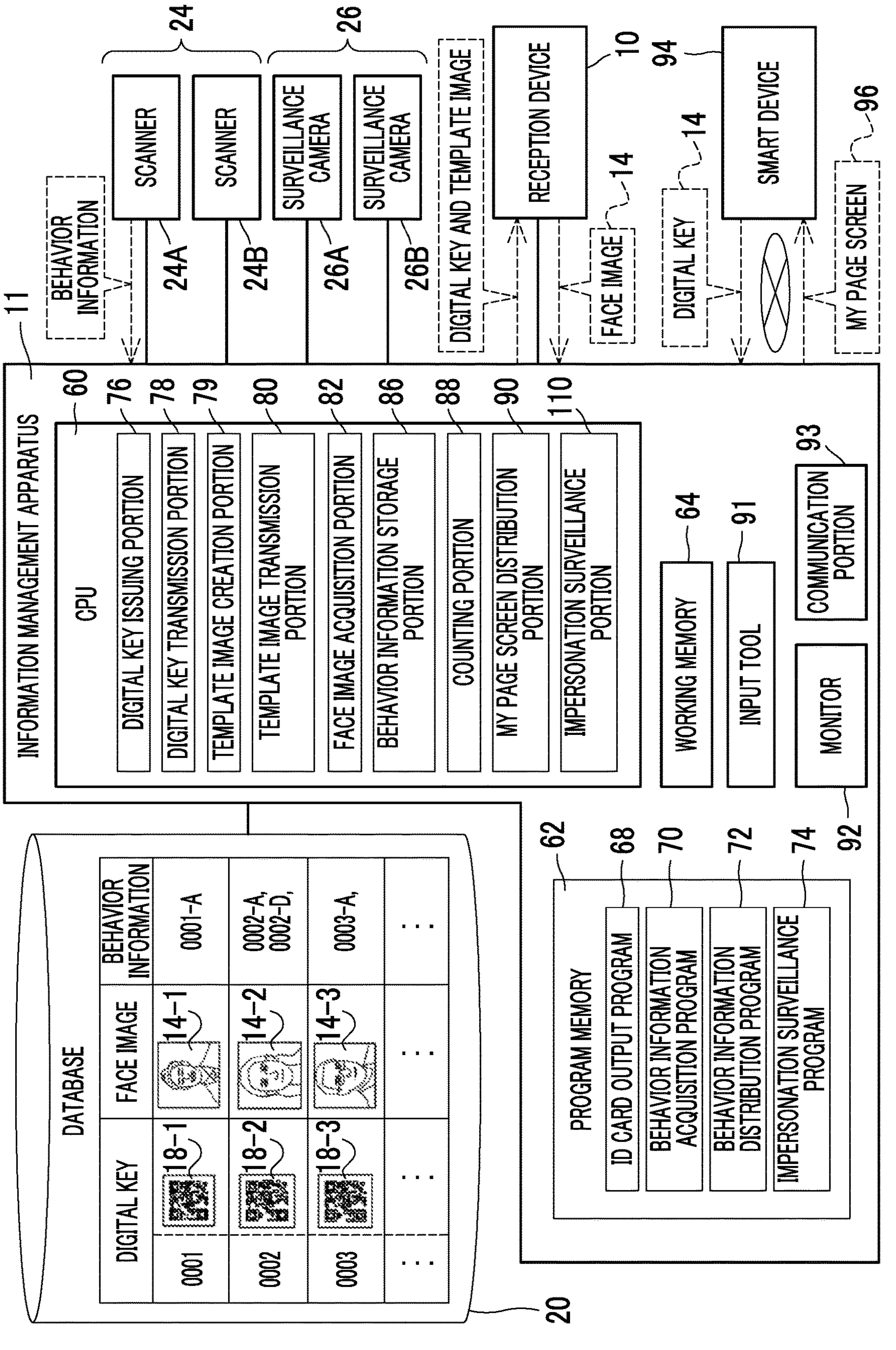
FIG. 23 is a block diagram of an information management apparatus according to the third embodiment.

As illustrated in FIG. 23 as an example, in the information management apparatus 11 according to the third embodiment, the program memory 62 stores an impersonation surveillance program 74 in addition to the ID card output program 68, the behavior information acquisition program 70, and the behavior information distribution program 72. The CPU 60 loads the impersonation surveillance program 74 into the working memory 64 and executes impersonation surveillance processing (refer to FIG. 24). Accordingly, the CPU 60 functions as an impersonation surveillance portion 110.

In a case where the behavior information is received from the scanner 24, the impersonation surveillance portion 110 requests the surveillance camera 26 arranged near the scanner 24 to transmit the surveillance data. The impersonation surveillance portion 110 receives the surveillance data transmitted from the surveillance camera 26. The impersonation surveillance portion 110 detects the face image of the person who has read the two-dimensional code 18 on the scanner 24 from the surveillance data. The impersonation surveillance portion 110 compares the face image detected from the surveillance data with the face image 14 stored in the database 20 in association with the digital key included in the behavior information. That is, the impersonation surveillance portion 110 determines whether or not the person who has read the two-dimensional code 18 on the scanner 24 and the participant 13 associated with the digital key are the same person.

In a case where it is determined that the person who has read the two-dimensional code 18 on the scanner 24 and the participant 13 associated with the digital key are the same person, the impersonation surveillance portion 110 stores the received behavior information in the database 20 in association with the digital key. On the other hand, in a case where it is determined that the person who has read the two-dimensional code 18 on the scanner 24 and the participant 13 associated with the digital key are not the same person, the impersonation surveillance portion 110 does not store the received behavior information in the database 20 and discards the received behavior information.

Next, an action of the information management system 2 according to the third embodiment will be described with reference to the flowchart in FIG. 24.

Figure 24:
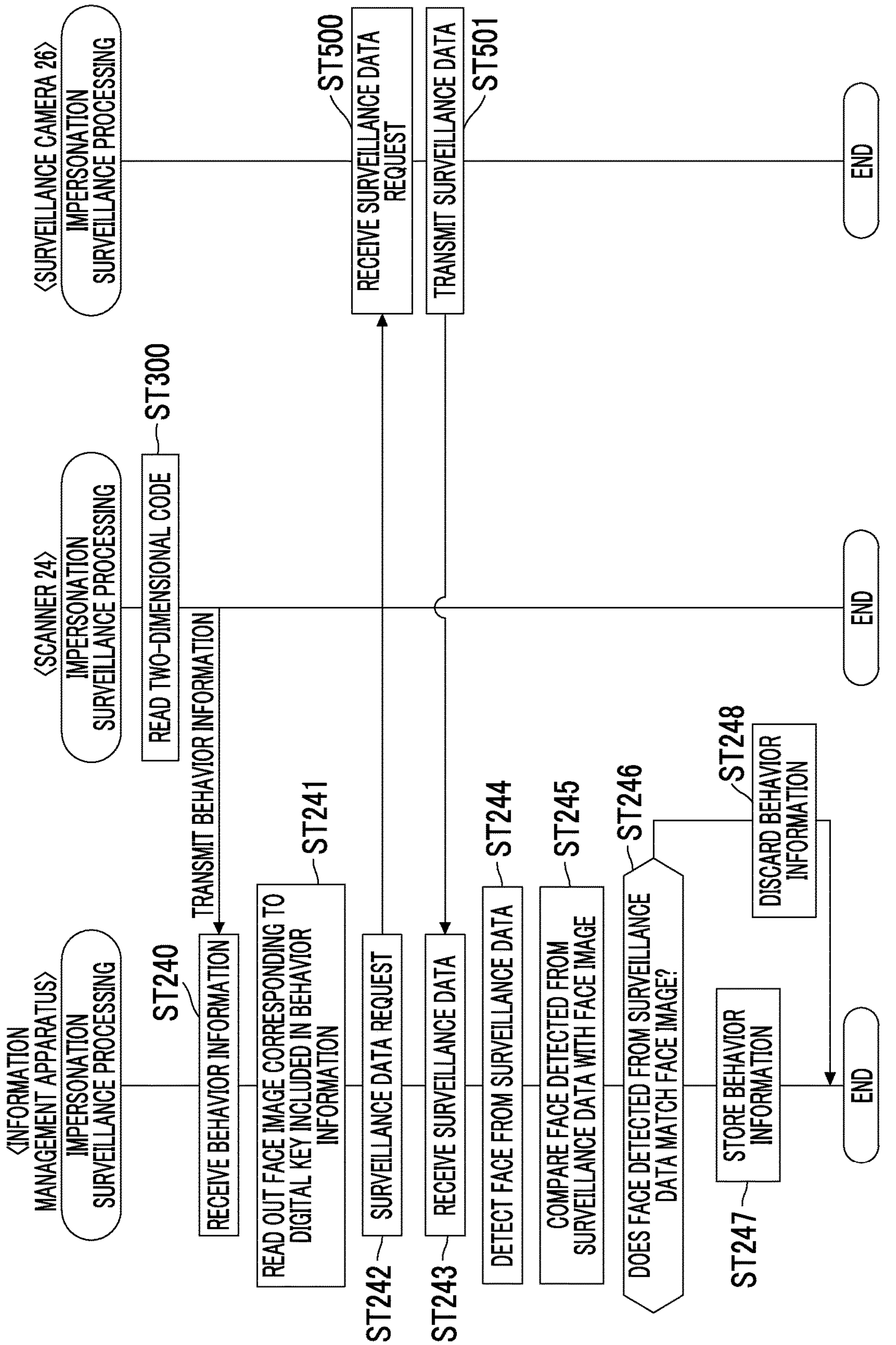
FIG. 24 is a flowchart of impersonation surveillance processing.

As illustrated in FIG. 24, for example, in a case where a person who has visited the exhibition booth 22 holds the two-dimensional code 18 printed on the ID card 15 on the scanner 24, the scanner 24 reads the digital key indicated by the two-dimensional code 18 (step ST300). The scanner 24 transmits the behavior information to the information management apparatus 11. The impersonation surveillance portion 110 of the information management apparatus 11 receives the behavior information (step ST240). The impersonation surveillance portion 110 reads out the face image 14 corresponding to the digital key included in the behavior information from the database 20 (step ST241).

The impersonation surveillance portion 110 requests the surveillance camera 26 arranged near the scanner 24 to transmit the surveillance data (step ST242). The surveillance camera 26 receives a transmission request of the surveillance data (step ST500) and transmits the surveillance data to the impersonation surveillance portion 110 (step ST501).

The impersonation surveillance portion 110 receives the surveillance data transmitted from the surveillance camera 26 (step ST243). The impersonation surveillance portion 110 detects a face image of the person who has held the two-dimensional code 18 on the scanner 24 from the surveillance data (step ST244). The impersonation surveillance portion 110 compares the face image detected from the surveillance data with the face image 14 read out from the database 20 (step ST245).

In a case where the face image detected from the surveillance data matches the face image 14 read out from the database 20 (YES in step ST246), the impersonation surveillance portion 110 stores the received behavior information in the database 20 in association with the digital key (step ST247). On the other hand, in a case where the face image detected from the surveillance data does not match the face image 14 read out from the database 20 (NO in step ST246), the impersonation surveillance portion 110 discards the received behavior information (step ST248).

As described above, according to the third embodiment, in a case where the behavior information including the digital key is received from the scanner 24, the CPU 60 of the information management apparatus 11 requests the surveillance camera 26 arranged near the scanner 24 to transmit the surveillance data. The CPU 60 of the information management apparatus 11 receives the surveillance data from the surveillance camera 26 and detects the face image from the surveillance data. The CPU 60 of the information management apparatus 11 determines whether or not the person who has read the two-dimensional code 18 on the scanner 24 and the participant 13 associated with the digital key are the same person by comparing the detected face image with the face image 14 stored in the database 20 in association with the digital key included in the behavior information. In a case where it is determined that the person who has read the two-dimensional code 18 by the scanner 24 and the participant 13 associated with the digital key are the same person, the CPU 60 of the information management apparatus 11 stores the received behavior information in the database 20 in association with the digital key as the behavior information of the participant 13 in the event venue. Thus, the information management system 2 according to the third embodiment can avoid the use of the ID card 15 by a certain person impersonating the holder of the ID card 15.

Fourth Embodiment

For example, the information management system 2 according to a fourth embodiment is used in an event such as a stamp rally, orienteering, or rogaining. In the fourth embodiment, the event may be held outdoors or indoors. Configurations of the reception device 10 and the information management apparatus 11 are the same as in the first embodiment and thus, will not be described. Hereinafter, the fourth embodiment will be described mainly based on differences from the first embodiment.

Figure 25:
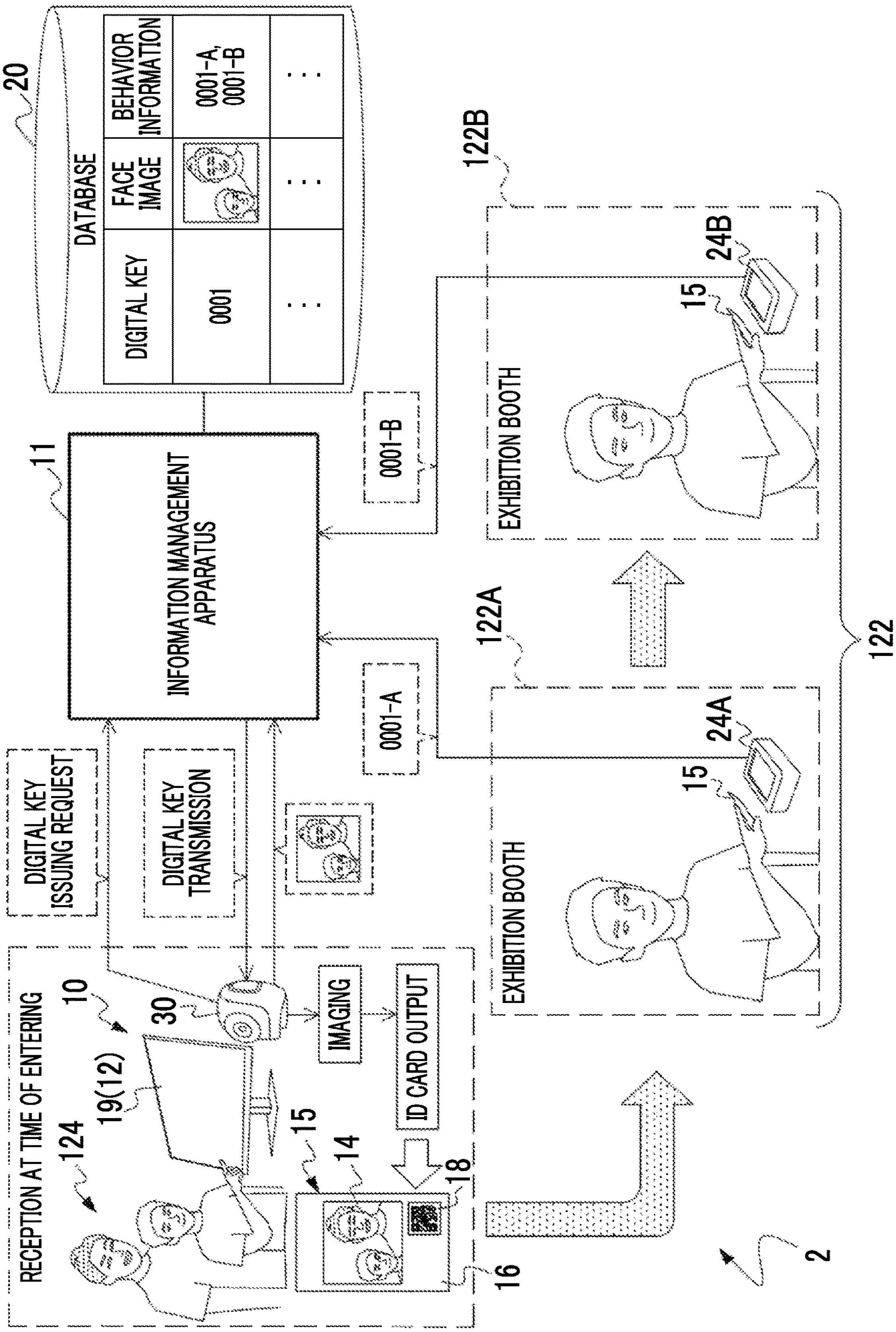
FIG. 25 is a schematic diagram of an information management system according to a fourth embodiment.

As illustrated in FIG. 25 as an example, in the information management system 2 according to the fourth embodiment, a plurality of checkpoints 122 are provided instead of the plurality of exhibition booths 22. The scanner 24A is comprised at a checkpoint 122A. The scanner 24A has the scanner ID "A". The scanner 24B is comprised at a checkpoint 122B. The scanner 24A has the scanner ID "B". The checkpoints 122A and 122B will be referred to as the "checkpoint 122" unless otherwise necessary to distinguish.

In the fourth embodiment, participation in the event is in units of groups of one or more persons. For example, a participant group 124 is a group consisting of two persons. The participant group 124 acquires the ID card 15 by performing imaging by the reception device 10 at the time of reception of the event. The face image 14 acquired in units of groups and the two-dimensional code 18 are printed on the ID card 15. The two-dimensional code 18 is obtained by coding a digital key that is a reference number assigned in units of groups in order of reception. In the example in FIG. 25, the digital key "0001" is assigned to the participant group 124.

The participant group 124 stops by the checkpoint 122 provided in the event venue and holds the two-dimensional code 18 on the scanner 24 comprised at the checkpoint 122. For example, in a case where the two-dimensional code 18 is held on the scanner 24A comprised at the checkpoint 122A, the behavior information "0001-A" including the digital key "0001" indicated by the two-dimensional code 18 and the scanner ID "A" of the scanner 24A is transmitted to the information management apparatus 11. The information management apparatus 11 receives the behavior information "0001-A". The information management apparatus 11 stores the behavior information in the database 20 in association with the digital key "0001" included in the behavior information.

Figure 26:
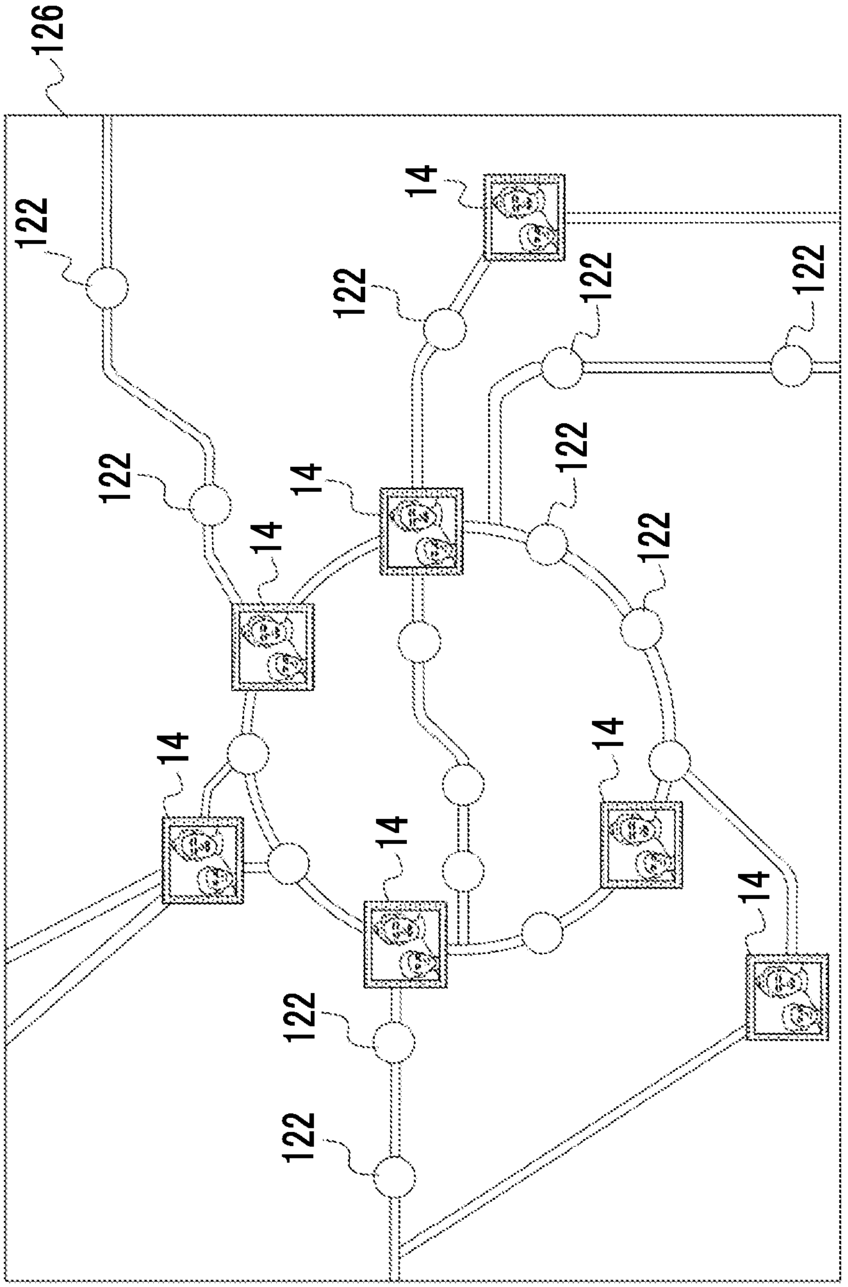
FIG. 26 is a schematic diagram illustrating a map.

As illustrated in FIG. 26 as an example, the behavior information of each group is output as a map 126. The plurality of checkpoints 122 are displayed on a plan of the event venue on the map 126. The face image 14 is displayed at the checkpoint 122 visited by the participant group 124. The map 126 may be output to the printer and printed on a paper or may be output to an external server and viewed on a smart device or the like.

As described above, according to the fourth embodiment, for example, the information management system 2 is used in an event such as a stamp rally, orienteering, or rogaining. For example, participants participate in the event in units of groups. In this case, the information management apparatus 11 assigns the digital key for each participant group 124. The information management apparatus 11 stores the behavior information of each participant group 124 in the database 20. The information management apparatus 11 outputs the behavior information of each participant group 124 as the map 126. The face images 14 of the participants included in the participant group 124 are displayed on the map 126. By displaying the face images 14 on the map 126, information about which participant is where can be intuitively known, compared to a case of not displaying anything on the map 126. Thus, enjoyability of the event for the participant is also increased. The information management system 2 can also be used for such an application illustrated in the fourth embodiment. Thus, outputting the behavior information as the map 126 enables the information management system 2 to be used in a wide range of events, compared to a case of outputting the behavior information as only the counting result.

Fifth Embodiment

The information management system 2 according to a fifth embodiment has a function of reading a business card of the participant. In the information management system 2 according to the fifth embodiment, the participant 13 inputs the personal information by reading a business card 130 by a business card scanner 132 at the reception counter. While the input of the personal information is not necessarily needed in the information management system 2 according to the embodiment of the disclosed technology, the personal information may be stored in the database 20 in association with the digital key, the face image 14, and the behavior information in a case where the participant 13 wants to provide the personal information. Examples of a case where the participant 13 wants to register the personal information include a case where the participant 13 wants to contact an event exhibitor later, or a case where the participant 13 can obtain any benefit from the event exhibitor by registering the personal information.

Figure 27:
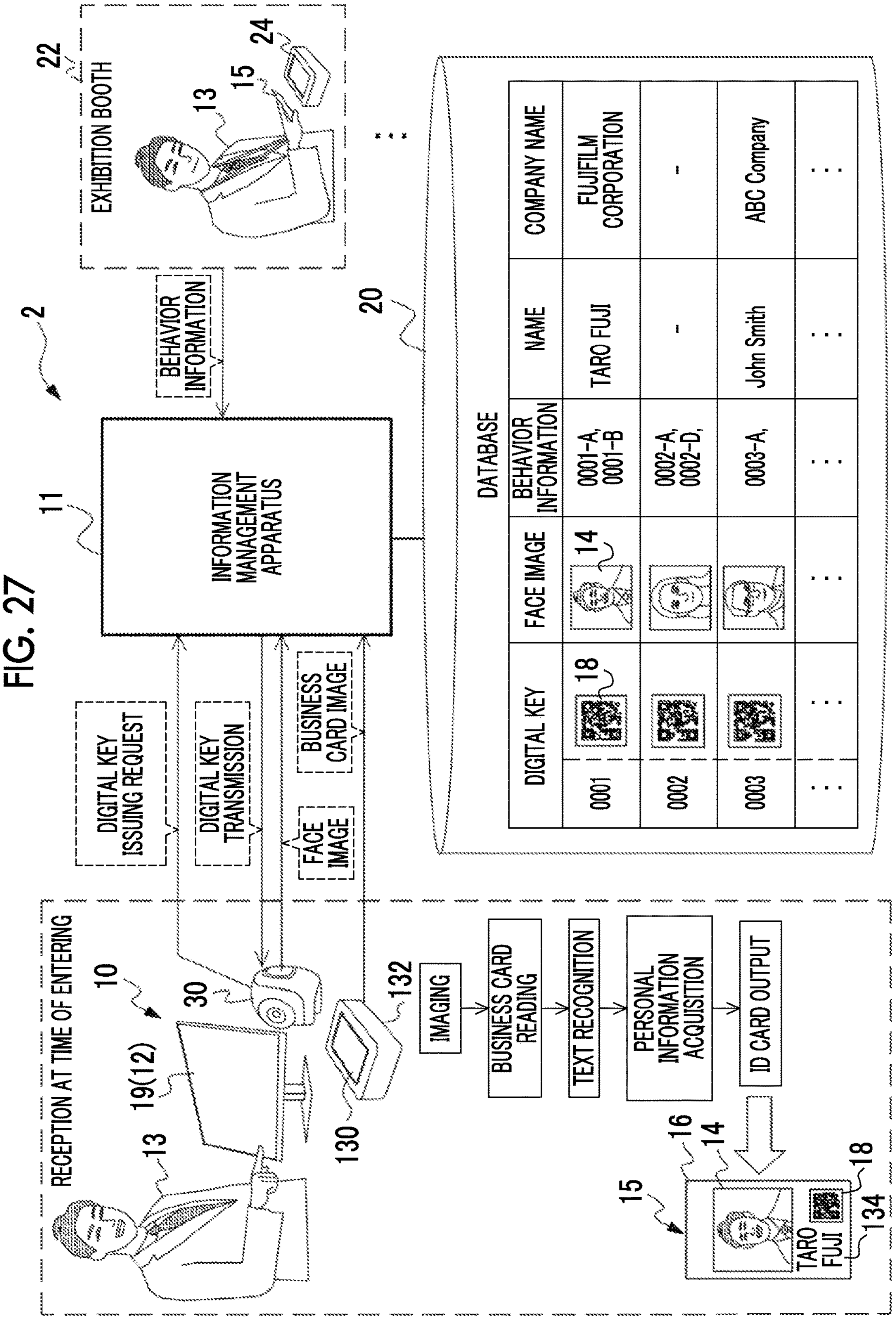
FIG. 27 is a schematic diagram of an information management system according to a fifth embodiment.

As illustrated in FIG. 27 as an example, the participant 13 registers the personal information at the reception counter. The business card scanner 132 is comprised at the reception counter. The business card scanner 132 is connected to the information management apparatus 11. The participant 13 reads the business card 130 by the business card scanner 132. The business card scanner 132 transmits a business card image obtained by reading an image of the business card 130 to the information management apparatus 11.

The information management apparatus 11 acquires the personal information of the participant 13-1 including a name, a company name, a job title, a telephone number, an email address, and the like by performing text recognition processing on the business card image. The information management apparatus 11 stores the acquired personal information in the database 20 in association with the digital key.

Other processing of the information management system 2 according to the fifth embodiment is the same as described in the first embodiment and thus, will not be described. In a case where the participant 13 provides the personal information, a name 134 may be included in the template image 23 in addition to the frame 21 and the two-dimensional code 18. In this case, the name 134 is printed on the ID card 15 created by combining the face image 14 with the template image 23.

A participant who does not want to provide the personal information may not provide the personal information. In FIG. 27, for example, a participant having the digital key "0002" does not provide the personal information. Thus, a name and a company name of the participant are not stored in the database 20. Even in a case where the participant does not provide the personal information, the ID card 15 of each participant is issued and used as the participant identification of the event as described in the first embodiment.

As described above, according to the fifth embodiment, the personal information of the participant 13 is stored in the database 20 in addition to the digital key, the face image 14, and the behavior information of the participant 13. Thus, the information management system 2 according to the fifth embodiment can be applied to a wider range of applications, compared to a case where only at least one of the digital key, the face image 14, or the behavior information of the participant 13 is stored in the database 20.

In the embodiments, while the reception device 10 comprises the digital camera 30 including the printer, and the digital camera 30 including the printer prints the ID image 25 on the instant film 16 by outputting the ID image 25 to the printer 35, the disclosed technology is not limited thereto. A digital camera not having a printer function may be used instead of the digital camera 30 including the printer. The digital camera may output the ID image 25 to an external printer. For example, the external printer prints the ID image 25 on a photo paper.

In the embodiments, while an exhibition, a stamp rally, orienteering, and rogaining are illustrated as the event, the disclosed technology is not limited thereto. The event includes an educational event such as a seminar and a workshop, a traditional event such as a festival, a cultural event such as a concert, a sports event such as a marathon race and the Olympics, and other various types of events.

In addition, the reception device 10 may output the ID image 25 to an external server. For example, the external server distributes the ID image 25 to the smart device 94 of the participant 13. In this case, the ID image 25 displayed on the smart device 94 functions as the ID card 15. Thus, consumables such as the instant film 16 or the photo paper are not necessary. Furthermore, since the participant 13 can concentrate event information including the ID card 15 in the smart device 94, there is an advantage of easy management of the event information for the participant 13. In addition, the ID image 25 may be directly transmitted to the smart device 94 from the reception device 10 without passing through the external server. In this case, short range wireless communication is used for communication between the reception device 10 and the smart device 94.

In addition, while an example in which the control circuit 40 of the digital camera 30 including the printer controls the entire reception device 10 is described, a CPU of a computer independent of the digital camera 30 including the printer may control the entire reception device 10. Accordingly, various modifications can be made to the configuration of the reception device 10.

In the embodiments, for example, various processors illustrated below can be used as a hardware structure of a processing portion that executes various processing of the control circuit 40 of the reception device 10 and the digital key issuing portion 76, the digital key transmission portion 78, the template image creation portion 79, the template image transmission portion 80, the face image acquisition portion 82, the behavior information storage portion 86, the counting portion 88, the my page screen distribution portion 90, and the impersonation surveillance portion 110 of the information management apparatus 11. The various processors include, in addition to the CPU 60 that is a general-purpose processor functioning as various processing portions by executing software (for example, the ID card output program 68, the behavior information acquisition program 70, the behavior information distribution program 72, a selection information acquisition program 107, a selection information distribution program 108, and the impersonation surveillance program 74), a programmable logic device (PLD) such as a field programmable gate array (FPGA) that is a processor having a circuit configuration changeable after manufacturing, and/or a dedicated electric circuit such as an application specific integrated circuit (ASIC) that is a processor having a circuit configuration dedicatedly designed to execute specific processing, and the like. A graphics processing unit (GPU) may be used instead of the FPGA.

One processing portion may be composed of one of the various processors or may be composed of a combination of two or more processors of the same type or different types (for example, a combination of a plurality of FPGAs and/or a combination of a CPU and an FPGA or a combination of a CPU and a GPU). In addition, a plurality of processing portions may be composed of one processor.

A first example of the plurality of processing portions composed of one processor is, as represented by a computer such as a client and a server, a form in which one processor is composed of a combination of one or more CPUs and software, and the processor functions as the plurality of processing portions. A second example is, as represented by a system on chip (SOC) and the like, a form of using a processor that implements functions of the entire system including the plurality of processing portions in one integrated circuit (IC) chip. Accordingly, various processing portions are configured using one or more of the various processors as a hardware structure.

Furthermore, more specifically, an electric circuit in which circuit elements such as semiconductor elements are combined can be used as a hardware structure of the various processors.

Figure 28:
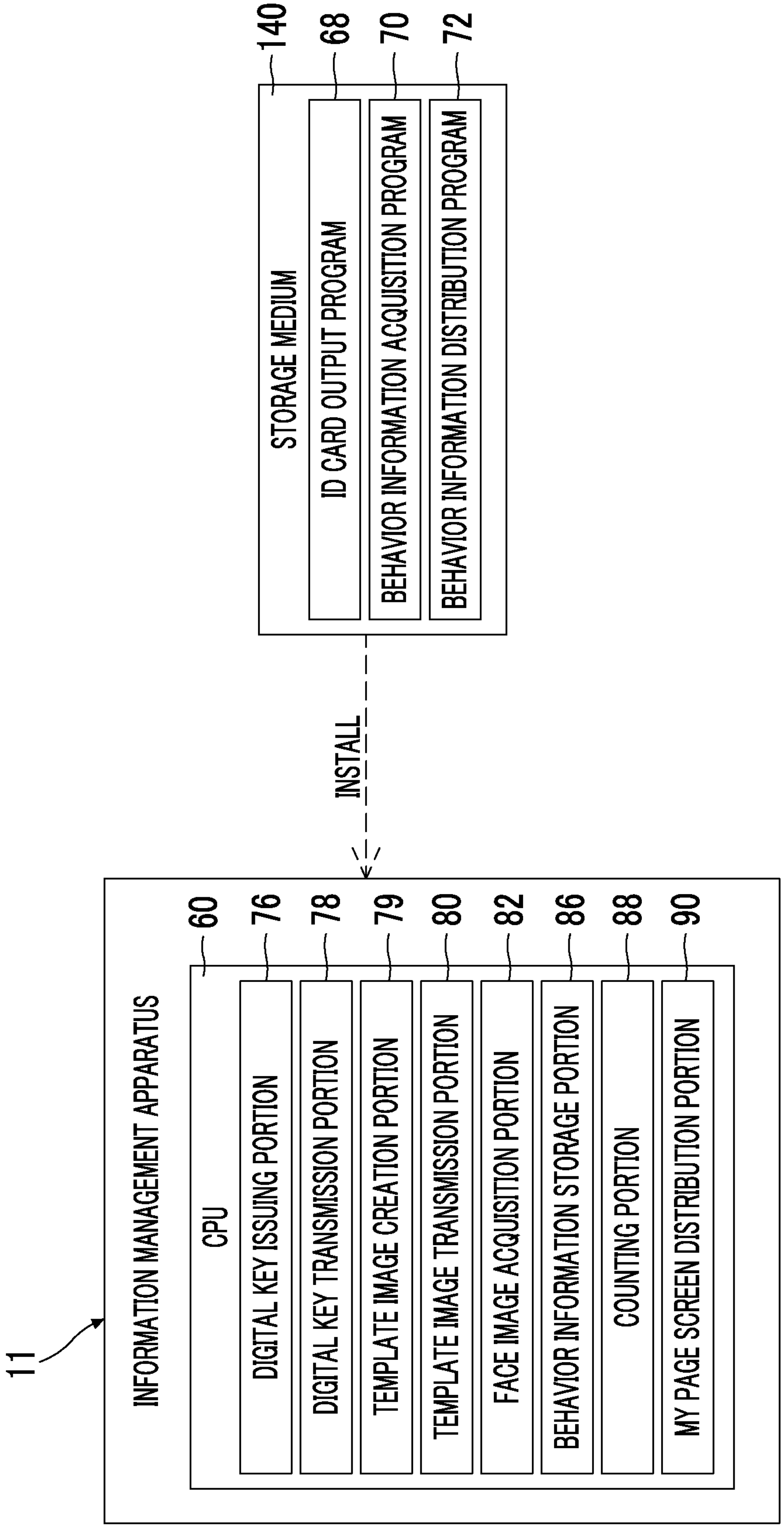
FIG. 28 is a description diagram illustrating an aspect in which an ID card output program, a behavior information acquisition program, and a behavior information distribution program stored in a storage medium are installed on the information management apparatus.

In addition, in the first embodiment, while various programs including the ID card output program 68, the behavior information acquisition program 70, and the behavior information distribution program 72 are stored in the program memory 62, the disclosed technology is not limited thereto. As illustrated in FIG. 28 as an example, the various programs may be stored in any portable storage medium 140 such as an SSD or a universal serial bus (USB) memory. In this case, the various programs stored in the storage medium 140 are installed on the information management apparatus 11. The CPU 60 executes the ID card output processing, the behavior information acquisition processing, and the behavior information distribution processing in accordance with the installed various programs. The same applies to the impersonation surveillance program 74 described in the third embodiment.

In addition, the various programs may be stored in a storage portion of another computer, a server apparatus, or the like connected to the information management apparatus 11 through a communication network (not illustrated), and the various programs may be downloaded to the information management apparatus 11 in accordance with a request from the information management apparatus 11. In this case, the CPU 60 executes the ID card output processing, the behavior information acquisition processing, and the behavior information distribution processing in accordance with the downloaded various programs.

Various embodiments and/or various modification examples described above can be appropriately combined in the disclosed technology. In addition, the disclosed technology is not limited to the embodiments and may employ various configurations without departing from the gist thereof. Furthermore, the disclosed technology also applies to, in addition to the program, a storage medium that stores the program in a non-transitory manner.

In addition, technology disclosed in the following appendices can be perceived from the above description.

APPENDIX 1

An information management apparatus that is communicably connected to a reception device including a camera which images a face of a participant participating in an event, and that manages information about the participant, the information management apparatus comprising at least one first processor, in which the first processor is configured to receive an issuing request transmitted from the reception device for a digital key assigned to each participant, issue the digital key independently of personal information of the participant, transmit the issued digital key to the reception device, in outputting, by the reception device, an ID image of the participant that includes a face image representing the face of the participant imaged by the reception device and the digital key received by the reception device and is issued for each participant, acquire the face image from the reception device, store the face image and the digital key in a database in association with each other, and in a case where information including the digital key is received from a plurality of reading devices that are installed in an event venue and read the digital key included in the ID image, store the received information in the database in association with the digital key as behavior information representing a behavior of the participant in the event venue.

APPENDIX 2

A reception device that is used communicably with an information management apparatus which manages information about a participant participating in an event, and that includes a camera which images a face of the participant, the reception device comprising at least one second processor, in which the second processor is configured to transmit an issuing request of a digital key assigned for each participant to the information management apparatus, receive the digital key issued independently of personal information of the participant in the information management apparatus, output an ID image of the participant that includes a face image representing the face of the participant imaged by the camera and the digital key and is issued for each participant, and in outputting the ID image, transmit the face image to the information management apparatus.

Above described contents and illustrated contents are detailed descriptions for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, unnecessary parts may be removed, new elements may be added, or parts may be replaced in the above described contents and the illustrated contents without departing from the gist of the disclosed technology. In addition, particularly, description related to common technical knowledge or the like that does not need to be described in terms of embodying the disclosed technology is omitted in the above described contents and the illustrated contents in order to avoid complication and facilitate understanding of the parts according to the embodiment of the disclosed technology.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. An information management system comprising:

a reception device including a camera that images a face of a participant participating in an event; and an information management apparatus that is communicably connected to the reception device and manages information about the participant, wherein the information management apparatus includes at least one first processor, and the first processor is configured to receive an issuing request transmitted from the reception device for a digital key assigned to each participant, issue the digital key independently of personal information of the participant, wherein the digital key is not information obtained by coding the personal information, transmit the issued digital key to the reception device, in a case where the reception device outputs an ID image of the participant that includes a face image representing the face of the participant imaged by the reception device and the digital key received by the reception device and is issued for each participant, acquire the face image from the reception device, store the face image and the digital key in a database in association with each other, and in a case where information including the digital key is received from a plurality of reading devices that are installed in an event venue and read the digital key included in the ID image, store the received information in the database in association with the digital key as behavior information representing a behavior of the participant in the event venue.

2. The information management system according to claim 1, wherein the reception device includes at least one second processor, and the second processor is configured to create the ID image by combining the face image of the participant with a template image, and output the ID image.

3. The information management system according to claim 2, wherein the second processor is configured to output the ID image to a printer.

4. The information management system according to claim 3, wherein the reception device includes a digital camera including a printer that includes the camera and a printer which prints the face image obtained by imaging performed by the camera on an instant film.

5. The information management system according to claim 1, wherein the digital key is included in the ID image in a form of a two-dimensional code.

6. The information management system according to claim 1, wherein the first processor is configured to transmit a template image to be combined with the face image to the reception device in addition to the digital key.

7. The information management system according to claim 1, wherein the first processor is configured to count behavior information of a plurality of participants and output a counted counting result.

8. The information management system according to claim 7, wherein the first processor is configured to output a counting result including the face image as the counting result.

9. The information management system according to claim 1, wherein the first processor is configured to receive a distribution request including the digital key from the participant and distribute the behavior information of the participant corresponding to the digital key.

10. The information management system according to claim 1, wherein the first processor is configured to, in a case where the information including the digital key is received from the reading device, request a surveillance camera arranged near the reading device to transmit surveillance data, receive the surveillance data from the surveillance camera, detect a face image from the surveillance data, determine whether or not a person who has operated the reading device and the participant associated with the digital key are the same person by comparing the detected face image with the face image stored in association with the digital key, and in a case where it is determined that the person who has operated the reading device and the participant associated with the digital key are the same person, store the received information in association with the digital key as the behavior information of the participant in the event venue.

11. An information management method used for an information management system including a reception device including a camera that images a face of a participant participating in an event, and an information management apparatus that is communicably connected to the reception device and manages information about the participant, the information management method comprising:

receiving an issuing request transmitted from the reception device for a digital key assigned to each participant, and issuing the digital key independently of personal information of the participant, wherein the digital key is not information obtained by coding the personal information;

transmitting the issued digital key to the reception device;

acquiring, in a case where the reception device outputs an ID image of the participant that includes a face image representing the face of the participant imaged by the reception device and the digital key received by the reception device and is issued for each participant, the face image from the reception device;

storing the face image and the digital key in a database in association with each other; and storing, in a case where information including the digital key is received from a plurality of reading devices that are installed in an event venue and read the digital key included in the ID image, the received information in the database in association with the digital key as behavior information representing a behavior of the participant in the event venue.

12. A non-transitory computer-readable storage medium storing a program executable by a computer to perform a process, the computer being used for an information management system including a reception device including a camera that images a face of a participant participating in an event, and an information management apparatus that is communicably connected to the reception device and manages information about the participant, the process comprising:

receiving an issuing request transmitted from the reception device for a digital key assigned to each participant, and issuing the digital key independently of personal information of the participant, wherein the digital key is not information obtained by coding the personal information;

transmitting the issued digital key to the reception device;

acquiring, in a case where the reception device outputs an ID image of the participant that includes a face image representing the face of the participant imaged by the reception device and the digital key received by the reception device and is issued for each participant, the face image from the reception device;

storing the face image and the digital key in a database in association with each other; and storing, in a case where information including the digital key is received from a plurality of reading devices that are installed in an event venue and read the digital key included in the ID image, the received information in the database in association with the digital key as behavior information representing a behavior of the participant in the event venue.

* * * * *